United States Patent
Ootaki et al.

[11] Patent Number: 6,078,554
[45] Date of Patent: *Jun. 20, 2000

[54] WAVE-FRONT ABERRATION COMPENSATION UNIT, WAVE-FRONT ABERRATION COMPENSATION DEVICE, AND OPTICAL PICKUP

[75] Inventors: Sakashi Ootaki; Masayuki Iwasaki; Masakazu Ogasawara, all of Saitama, Japan

[73] Assignee: Pioneer Electronic Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/848,655

[22] Filed: Apr. 29, 1997

[30] Foreign Application Priority Data

Apr. 30, 1996 [JP] Japan .................................. 8-109793
Mar. 11, 1997 [JP] Japan .................................. 9-056318

[51] Int. Cl.$^7$ ............................................. G11B 7/00
[52] U.S. Cl. .................... 369/112; 369/44.32; 369/44.23
[58] Field of Search .............................. 369/112, 110, 369/109, 94, 58, 44.23, 120, 54

[56] References Cited

U.S. PATENT DOCUMENTS

| | | | |
|---|---|---|---|
| 5,416,757 | 5/1995 | Luecke et al. | 369/112 |
| 5,442,615 | 8/1995 | Ohsato et al. | 369/112 |
| 5,638,353 | 6/1997 | Takahashi | 369/112 |
| 5,734,637 | 3/1998 | Ootaki et al. | 369/112 |
| 5,748,602 | 5/1998 | Chao et al. | 369/110 |
| 5,748,603 | 5/1998 | Kim et al. | 369/112 |
| 5,768,242 | 6/1998 | Juday | 369/103 |
| 5,787,061 | 7/1998 | Tsuchiya et al. | 369/112 |
| 5,787,062 | 7/1998 | Mochizuki | 369/112 |
| 5,793,735 | 8/1998 | Oono | 369/116 |
| 5,798,994 | 8/1998 | Kamatani | 369/112 |
| 5,838,653 | 11/1998 | Fan et al. | 369/94 |

*Primary Examiner*—Nabil Hindi
*Attorney, Agent, or Firm*—Sughrue, Mion, Zinn, Macpeak & Seas, PLLC

[57] ABSTRACT

An LCD panel will rotate based on an external control signal by a prescribed angle such portion of light flux, that enters an objective lens, corresponding to a predetermined incident point and, at the same time, will change by a prescribed length an optical path of this portion of optical flux whose aberrations are in excess of a prescribed standard value. It is thus possible to compensate the wave-front aberrations due to the differences in the effective optical-path length and also to control the effective numerical aperture of the objective lens by utilizing linearly polarized light as the light to be emitted from the laser beam source. It is also possible to compensate the aberrations due the differences in the substrate thickness of the optical recording medium and those due to a tilt of the optical recording medium.

16 Claims, 19 Drawing Sheets

ELECTRODE PATTERN
FOR DVD/CD SWITCHING

ELECTRODE PATTERN
FOR TILT COMPENSATION

FIG. 6
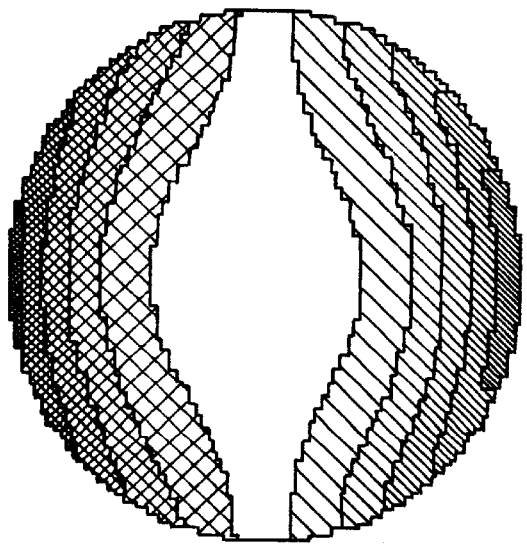
CALCULATION CONDITIONS
NA OF OBJECTIVE : 0.6
DISK THICKNESS:0.6mm
DISK TILT:1 DEGREE
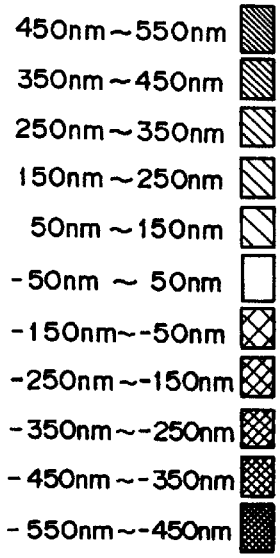
450nm~550nm
350nm~450nm
250nm~350nm
150nm~250nm
50nm~150nm
-50nm~50nm
-150nm~-50nm
-250nm~-150nm
-350nm~-250nm
-450nm~-350nm
-550nm~-450nm
RMS OF WAVE-FRONT ABERRATION:190nm
$$Wrms = \sqrt{\frac{\int\int (W(r,\phi) - W_0^2) \, r \, dr \, d\phi}{\pi}}$$

DIVIDED-DY-3 ELECTRODE PATTERN, FOR TILT COMPENSATION

CALCULATION CONDITIONS
NA OF OBJECTIVE:0.6
DISK THICKNESS:0.6mm
DISK TILT:1 DEGREE

225nm ~275nm
175nm ~225nm
125nm ~175nm
75nm ~125nm
25nm ~ 75nm
-25nm ~ 25nm
-75nm~ -25nm
-125nm~-75nm
-175nm~-125nm
-225nm~-175nm
-275nm~-225nm

RMS OF WAVE-FRONT ABERRATION:68nm

WAVE-FRONT ABERRATION COMPENSATION UNIT, WAVE-FRONT ABERRATION COMPENSATION DEVICE, AND OPTICAL PICKUP

BACKGROUND OF THE INVENTION

1. Field of the Invention

The present invention relates generally to a wave-front aberration compensation unit, wave-front aberration compensation device, and optical pickup, and more particularly to such a compatible-type wave-front aberration compensation unit, wave-front aberration compensation device, and optical pickup that can be used with a plurality of optical media with different disk thicknesses and recording densities such as digital video disks (DVDs) and compact disks (CDs).

2. Description of the Related Art

Since an optical pickup to reproduce DVD contents would involve high-density recording six times to eight times that of CDs of digital information, including moving-picture and computer data onto the DVDs having the same 12-cm diameter as the CDs, it is necessary to substantially reduce the spot diameter of the laser beam required to read out the pit information as compared to the optical pickup required to reproduce the CD contents.

Therefore, the optical pickup which can reproduce DVDs can also read out the data recorded on DVDs, each side of which is formatted for a high-recording density of about 5-G bytes, approximately eight times that of CDs, by reducing the beam spot diameter, specifically by decreasing the laser beam source wavelength from a CD-spec value of 780 nm down to 650 nm or 635 nm and also by increasing the objective lens's numerical aperture (NA) from a CD-spec value of 0.45 up to 0.6.

CDs, which generally employ the same recording format as DVDs, should preferably be reproduced on a DVD player.

However, if the laser beam wavelength, lambda, is shortened and also the NA of the objective lens is increased for playing on a DVD player, even a slight tilt of the disk may give rise to a wave-front aberration, mainly comatic aberration, thus reducing the margin for the perpendicular displacement angle of the disk surface from the optical axis of the optical pickup, i.e., tilt angle.

Also, if the CD has a larger thickness than a DVD, for example, in such a case where a two-sheet DVD is 0.6 mm thick each and a CD is 1.2 mm thick and when an optical pickup (of the optical system) originally for reproducing DVDs is used to reproduce CDs, a wave-front aberration, mainly spherical one, occurs, substantially increasing the laser beam spot diameter.

Therefore, the conventional optical pickups (of the optical system) for DVDs have a problem that they cannot read out the data recorded on CDs.

To solve this problem, the following methods have been proposed: providing and switching two different objective lenses of one for DVDs and the other for CDs; inserting a compensation lens at the collimator to compensate aberrations due to disks; or by employing a two-focus lens utilizing a hologram as the objective lens.

However, the method of using two objective lenses or a compensation lens would complicate the mechanism and require a large installation space and, therefore, is not suitable for the miniaturization trend.

Also, the method of using a hologram must utilize diffraction and/or interference and also the multi-beam system, so that it has a low optical utilization efficiency and is easily influenced by interference because of the multi-beam system.

Moreover, even if either of the abovementioned methods is used to make up the system so as to be used on both DVDs and CDs, it is difficult to simultaneously carry out tilt compensation, which compensates the aberration due to disk tilt, so that a tilt compensation device must also be equipped.

If, however, a tilt compensation device is provided independently, another problem would be produced that the system would become large and expensive.

SUMMARY OF THE INVENTION

It is therefore an object of the present invention to provide a rather simple and easy-to-miniaturize wave-front aberration compensation unit which can compensate an aberration, mainly spherical aberration, due to the differences in the disk thickness and an aberration, mainly comatic aberration, due to the disk tilt when using a recording/reproducing system for a plurality of optical memory media such as DVDs and CDs, which have different disk thicknesses and recording densities.

A further object of the present invention is to provide a wave-front aberration compensation device equipped with the abovementioned wave-front aberration compensation unit.

A still further object of the present invention is to provide an optical pickup which utilizes such a wave-front aberration compensation device.

To achieve first object, the the first embodiment of the present invention provides such a structure that a wave-front aberration compensation unit which is located on the optical path between a light source and an objective lens to compensate wave-front aberrations of the light emitted from this light source is equipped with optical-path length changing means which will change by a prescribed length the optical path of light flux which enters that objective lens.

This structure will allow compensating the wave-front aberrations due to the differences in the actual optical path length.

To achieve the first object, the second embodiment of the present invention provides such a structure that a wave-front aberration compensation unit which is located in the optical path between a light source and an objective lens to compensate wave-front aberrations of the light emitted from this light source, is equipped with polarization-plane rotation means which rotates by a prescribed angle the polarization plane of some light flux which enters this objective lens, based on an external control signal and corresponds to a predetermined incident point.

This structure will use linear polarization to the light emitted from the light source at the same time as inserting a polarizing plate in the optical path, to control the effective numerical apertures of the objective lens.

To achieve the first object, the third embodiment of the present invention provides such a structure that a wave-front aberration compensation unit which is located in the optical path between a light source and an objective lens to compensate wave-front aberrations of the light emitted from this light source is equipped with rotation-angle/optical-path changing means that rotates by a prescribed angle some light flux which enters that objective lens, based on an external control signal and also corresponds to the abovementioned incident point and also that changes by a prescribed value the optical path length of a portion of the light flux whose wave-front aberration length exceeds a prescribed standard value.

This structure will compensate wave-front aberrations due to the differences in the actual optical path length and also use linearly polarized light emitted from the light source at the same time as inserting a polarizing plate in the optical path, to control the effective numerical apertures of the objective lens.

To achieve the second object, the wave-front aberration compensation device using a wave-front aberration compensation unit according to the first, second, or third embodiment of the present invention is equipped with voltage application means which applies, based on external information, a prescribed value of voltage corresponding to this information, onto the abovementioned electrodes.

This structure will control application voltage and compensate wave-front aberrations by easily corresponding to various lengths of aberration.

To achieve the third object of the present invention, an optical pickup equipped with the abovementioned wave-front aberration compensation device is also provided with tilt detection means which detects the tilt of an optical recording medium with respect to the optical axis and then sends out a detection signal to the abovementioned voltage application means.

This structure will enable applying an optimal value of voltage corresponding to a tilt of the optical recording medium, to easily compensate the wave-front aberrations due to that tilt so that an access can be surely made to that medium.

BRIEF DESCRIPTION OF THE DRAWINGS

The above and other objects and features of the present invention will be more apparent from the following description taken in conjunction with accompanying drawings, in which:

FIG. 6 is an explanatory diagram (1) showing the wave-front aberration distribution at the Gauss image point;

DESCRIPTION OF THE PREFERRED EMBODIMENTS

Various embodiments of the present invention will be described with reference to the accompanying drawings.
First Embodiment The first embodiment of the present invention assumes an idealistic optical system, i.e. Gaussian optical system, which has the Gauss image point.

Here, the Gaussian optical system refers to such a system that has a sufficiently small aperture angle of the lens and also that the following approximation can be established.

$\sin\theta \approx \tan\theta \approx \theta$

Figure 1:
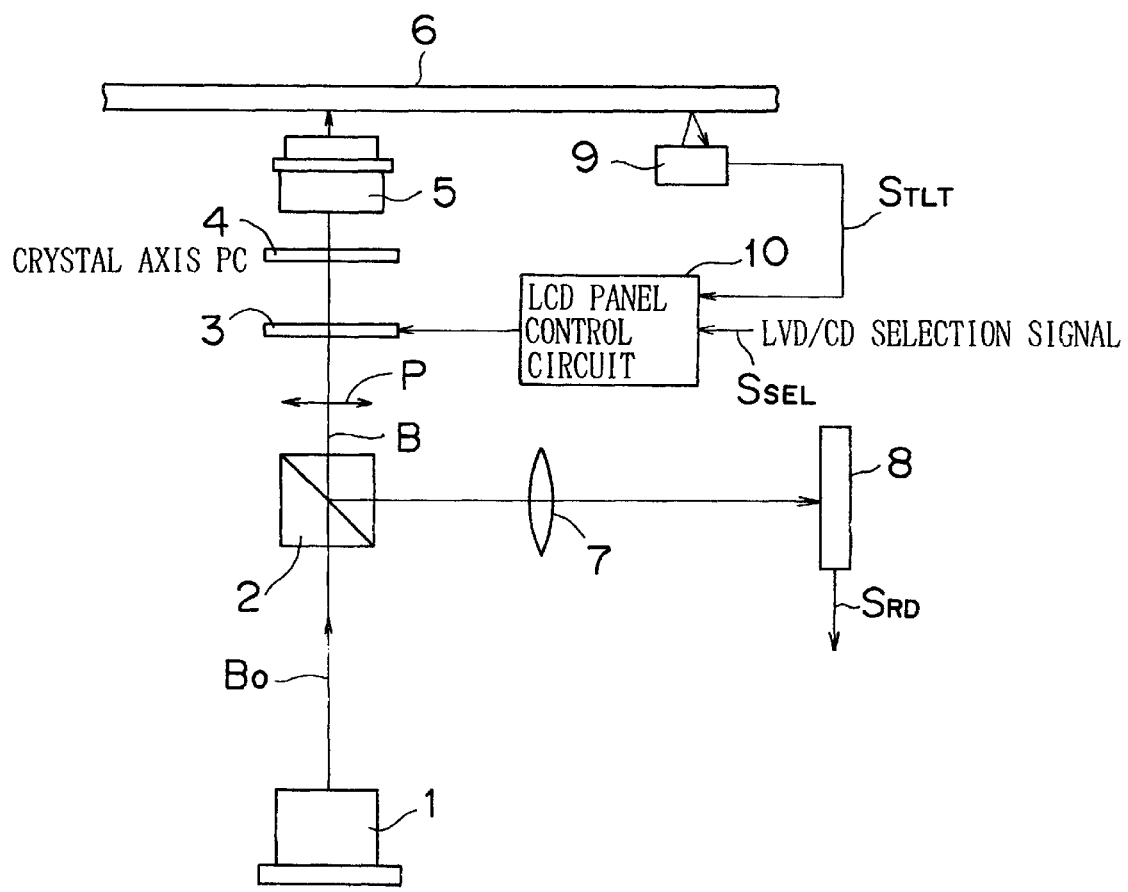
FIG. 1 is a block diagram illustrating the principles of an optical pickup according to an embodiment of the present invention.

FIG. 1 shows the principles on which an optical pickup operates.

An optical pickup comprises a laser beam source 1 which emits laser beam B0 (read-out laser beam) having a polarization plane P which reads out information recorded on an optical disk 6 such as a DVD or CD; polarization beam splitter 2 which transmits the laser beam B0 as laser beam B, which is linearly polarized light by the polarization plane B and also which emits laser beam with this polarization plane 3 rotated by 90 degrees; an LCD panel for compensating wave-front aberrations; a divided-by-4 wavelength plate 2 which gives a divided-by-4 wavelength difference in the optical path of two pieces of linearly polarized light which vibrate mutually perpendicularly; an objective lens 5 which converges the laser beam B onto an optical disk 6 described later; a converging lens 7 which converges the laser beam which is reflected by the optical disk 6 and transmitted through the objective lens 5, the divided-by-4 wavelength plate 4, and the LCD panel 3 and then reflected by the polarization beam splitter 2; a photoreceptor 8 which receives the laser beam B converged by the converging lens 7 and photoelectrically transfers it and then sends it as a read-out signal SRD; a tilt sensor 9 which detects a tilt of the optical disk 6 and sends a tilt detection signal STLT; and an LCD panel control circuit 10 which controls the LCD panel 3 based on the tilt detection signal STLT and an external disk selection signal, which is given as the DVD/CD selection signal in FIG. 1.

In this case, a crystal axis P0 of the divided-by-4 wavelength plate 4 is, as mentioned later (see FIG. 5), is so arranged as to intersect at an angle of 45 degrees the polarization plane P of the laser beam B as linearly polarized by the polarization beam splitter 2.

These operations are outlined below.

The laser beam B emitted from the laser beam source 1 passes through the polarization beam splitter 2, the LCD panel 3, and the divided-by-4 wavelength plate 4 in this order and then reaches the objective lens 5.

Then, the laser beam B is converged by the objective lens 5 and focused onto the information recording surface of the optical disk 6.

Then, the laser beam B is reflected by that information recording surface of the optical disk 6 and passes through the objective lens 5 and the LCD panel 3 and then reaches the polarization beam splitter 2.

In this optical path, the laser beam B is transmitted through the divided-by-4 wavelength plate twice, and its polarization plane is rotated by 90 degrees, so that the laser beam B is reflected by the polarization beam splitter 2 and then reaches the converging lens 7.

The converging lens 7 converges the laser beam B, which is then focused onto the photoreceptor 8, which then sends out the read-out signal SRD according to its own photoreceptive conditions.

Figure 2:
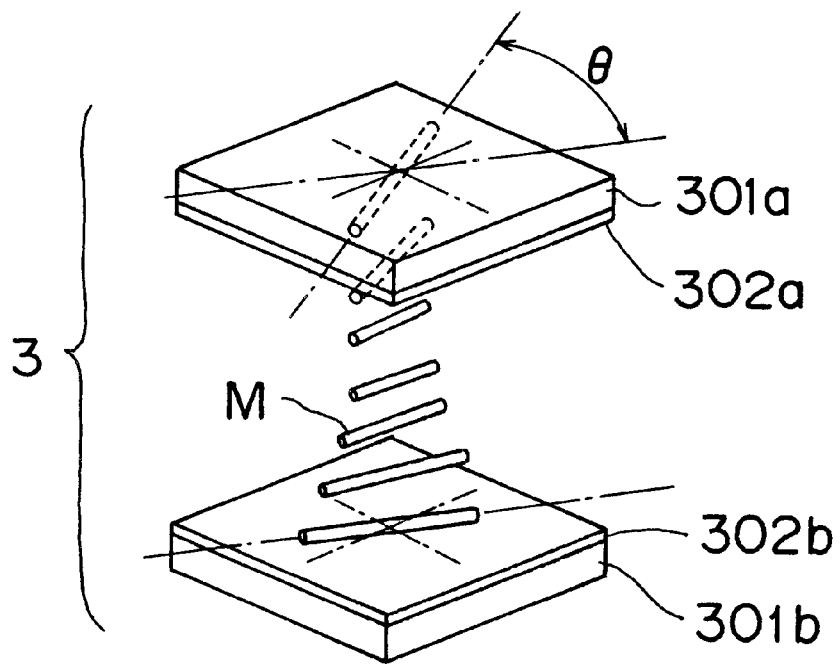
FIG. 2 is a schematic perspective view showing the twisted orientation of the liquid crystal molecules.
Figure 3:
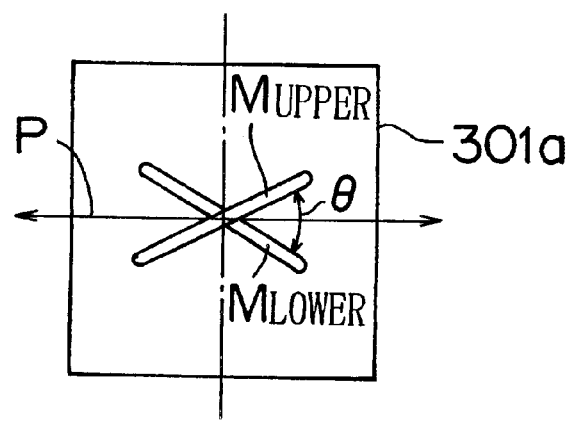
FIG. 3 is a schematic plan view of FIG. 2.

FIG. 2 gives a schematic perspective view showing the twisted orientation state of the liquid crystal molecules of the LCD panel and FIG. 3, which is given as the schematic plan view of FIG. 2.

In the LCD panel 3, as shown in FIGS. 2 and 3, liquid crystal molecules M inserted between glass substrates are twist-oriented at a prescribed angle, theta, in a range of 15 degrees through 60 degrees.

On the upper (or lower) side of the LCD panel 3 shown in FIG. 1 is formed an electrode pattern of a transparent electrode 302a (or 302b respectively) for the purpose of DVD/CD switching, i.e. such that have a prescribed geometry so as to change the apparent numerical apertures of the objective lens 5.

Also, on the lower (or upper) side of the LCD panel shown in FIG. 1 are formed electrode patterns of a transparent electrode 302b (or 302a) having such a prescribed geometry as to compensate the tilt.

As a result, the LCD panel control circuit 10 controls and changes the voltage to be applied onto the patterns of those upper and lower transparent electrodes, so that even only one optical pickup can perform both DVD/CD switching and tilt compensation. The concrete structure of the LCD panel 3 is described below.

In the LCD panel 3 shown in FIG. 2, the liquid crystal molecules M inserted between the upper and lower glass substrates 301a and 301b are twist-oriented therebetween at a prescribed angle, e.g. theta=45 degrees, in a range of 15 degrees through 60 degrees. To twist those molecules, specifically an orientation film is used which is evaporated onto the surfaces of the transparent electrodes 302a and 302b.

Figure 4A:
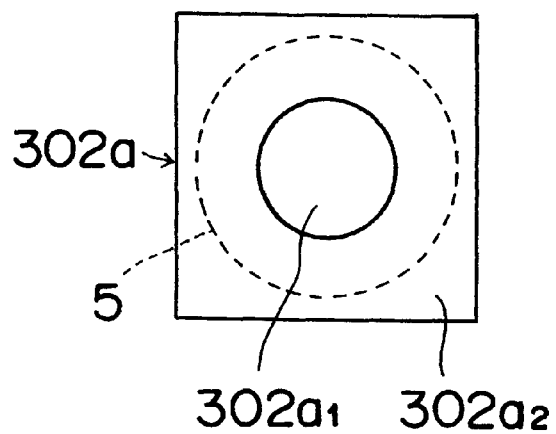
FIG. 4A is a plan views illustrating an example of the pattern of a transparent electrode, for DVD/CD changing, formed on the upper side of the LCD panel.
Figure 4B:
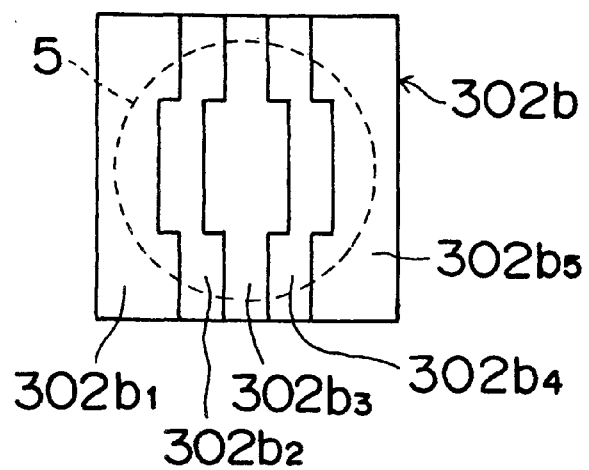
FIG. 4B is a plan view illustrating an example of the pattern of a transparent electrode, for tilt compensation, formed on the lower side of a the LCD panel.

FIGS. 4A and 4B show examples of the formation of transparent electrodes. FIG. 4A is a plan view of an electrode for the purpose of DVD/CD switching and FIG. 4B, a plan view of a divided-by-5 electrode for the purpose of tilt compensation.

Moreover, on the upper transparent electrode 302a are formed an electrode pattern suitable for DVD/CD switching, i.e. a circular pattern 302a1, such as shown in FIG. 4A, having a diameter which provides a numerical aperture NA suitable for CD reproduction, e.g. NA=0.37 approximately with the laser wavelength being 650 nm, and also a surrounding circumferential pattern 302a2. On the lower transparent electrode 302b, as shown in FIG. 4B, divided-electrode patterns 302b1 through 302b5 suitable for tilt compensation are formed.

As shown in FIG. 3, the LCD panel 3 is tilted at such a certain angle that the polarization plane P for the laser beam B which is linearly polarized light passing through the polarization beam splitter 2 and entering the LCD panel 3 may be within a twist angle theta.

In the case shown in FIGS. 1 through 4 (and FIG. 6), this twist angle theta is set at 45 degrees and the polarization plane P for the laser beam B is set at 22.5 degrees, just a half of this twist angle theta.

As can be seen from FIG. 5, at voltage below 2V the amount of light received is almost 0%, while above 3.5V the amount is 90% to 100%.

Consequently, it is possible to control the amount of light received, by changing the voltage to be applied onto the transparent electrodes of the LCD panel 3.

On the other hand, the wave-front aberration distribution of the recording surface of the optical disk 6 at the Gauss image point is such as shown in FIG. 6 in the case where the tilt (inclination) angle of the optical disk 6 is 1 (one) degree, the numerical aperture of the objective lens 5 NA=0.6, and the thickness of the optical disk 6's substrate is 0.6 mm, which corresponds to DVD applications.

Figure 7:
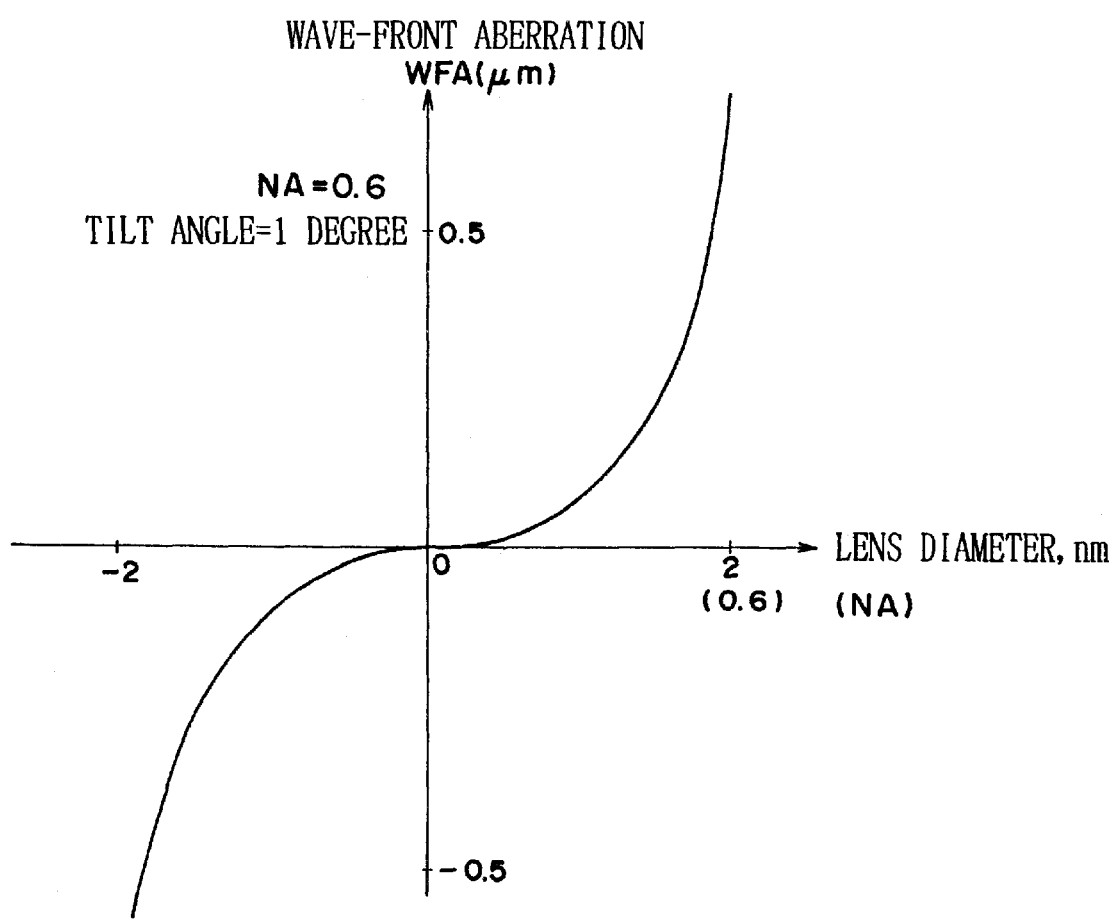
FIG. 7 is an explanatory diagram (2) showing the wave-front aberration distribution at the Gauss image point.

The diametrical wave-front aberration distribution of the optical disk 6 is such as shown in FIG. 7.

More specifically, the wave-front aberration which occurs when the optical disk has a tilt (inclination) mainly consists of a comatic aberration, which occurs point-symmetrically with respect to the image center as shown in FIGS. 6 and 7.

With this, this embodiment would rotate by a prescribed angle, the polarization plane of either portion of the laser beam entering the LCD panel 3 which is not to be used to read out the recorded information or that used to do so, to control the apparent numerical aperture of the objective lens 5 so that only that portion to be used may be applied onto the optical disk 6 and, at the same time, it would change by a prescribed length the optical path of that portion of the laser beam whose wave-front aberrations are in excess of a prescribed standard value, i.e. individually control the voltage applied onto each electrode pattern of the LCD panel 3, to compensate the wave-front aberration at the Gauss image point, thus simultaneously enabling DVD/CD switching and disk tilt compensation.

Figure 8:
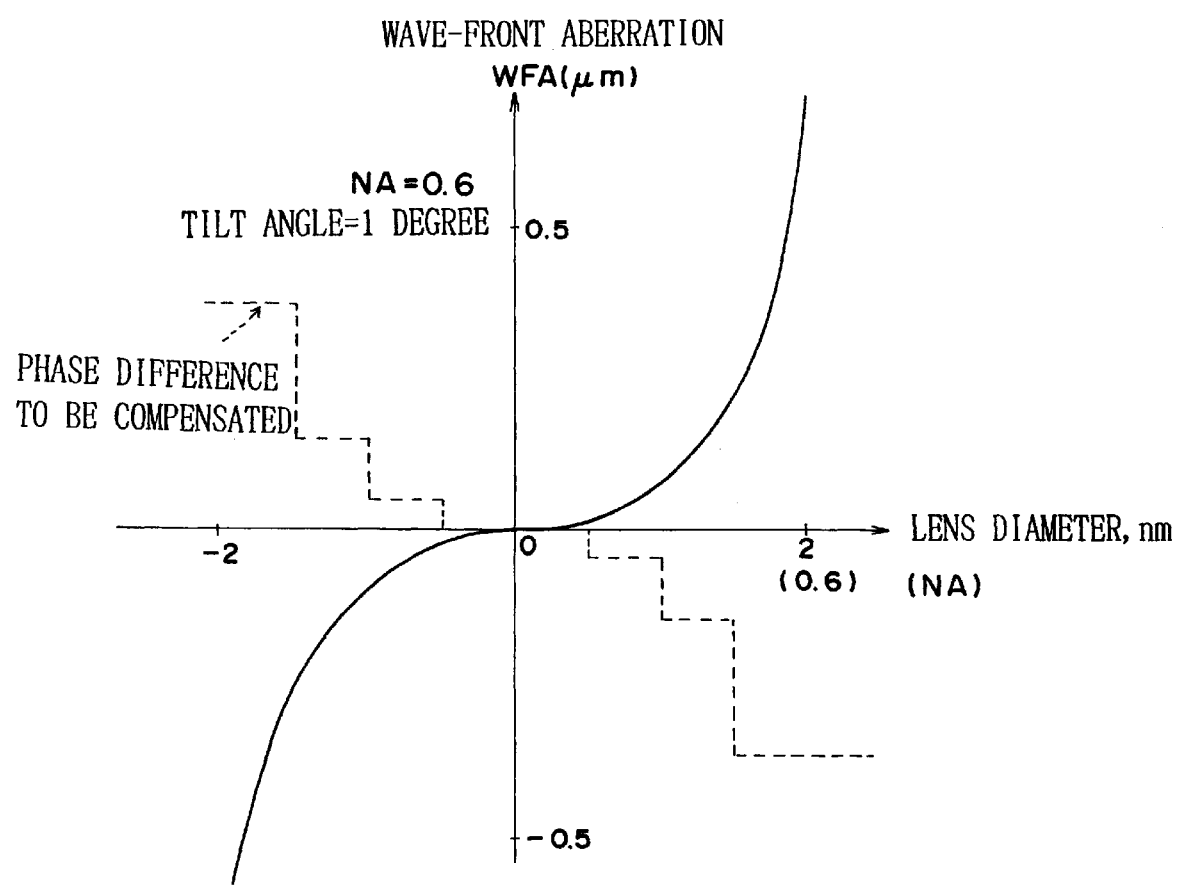
FIG. 8 is an explanatory diagram showing the wave-front aberration compensation according to the fist embodiment.

Now, the operations of the pickup are described below with reference to FIG. 8 illustrating the operational principles at the times of (1) DVD reproduction, (2) CD reproduction, and (3) tilt compensation.

(1) At the Time of DVD Reproduction

At the time of DVD reproduction, the LCD panel control circuit 10 (see FIG. 1) receives the DVD selection signal as a disk selection signal SSEL.

When having received the DVD selection signal, the LCD panel control circuit 10 shortcircuits to ground (the earth potential) the total surfaces of the transparent electrode 302b on the lower side of the LCD panel 3 (see FIG. 4B) and, at the same time, applies voltage, e.g. 3.5V, to the total surfaces of the upper side transparent electrode 302a (see FIG. 4A).

When 3.5V is applied onto it, the resultant electric field causes all the liquid crystal molecules M in the LCD panel 3 to come into almost perpendicular orientation, so that that panel 3 acts as a simple transparent plate throughout its surface, providing little polarization due to twisting.

As a result, the laser beam B consisting of linearly polarized light which has entered the LCD panel 3 via the polarization beam splitter 2 passes through the polarization plane without rotating it and then reaches the divided-by-4 wavelength plate 4.

Since its polarization plane P intersects the crystal axis Pc of the divided-by-4 wavelength plate 4 at an angle of 45 degrees, the laser beam, originally linearly polarized light, which has entered the divided-by-4 wavelength plate 4 is transformed into circularly polarized light and reflected by the information recording surface of the disk 6.

Then, the laser beam, which is now circularly polarized light, enters the divided-by-4 wavelength plate 4 again, to be transformed into linearly polarized light.

At the point in time, since its polarization plane has been rotated by 90 degrees with respect to its original linear polarization plane, the reflected laser beam, which is now linear, is polarized so as to be perpendicular to the polarization plane P of the polarization beam splitter 2.

The reflected beam consisting of this 90-degree-rotated linearly polarized light passes unchanged through the LCD panel 3 now acting as a transparent plate and then reaches the polarization beam splitter 2. As mentioned earlier, since its polarization plane has been rotated so as to be perpendicular to the polarization plane P of the polarization beam splitter 2, the reflected beam is reflected by the polarization beam splitter 2 into the horizontal direction and then received by the photoreceptor 8 via the converging lens 7.

Thus, at the time of DVD reproduction, the total surfaces of the LCD panel 3 are caused to act as a simple transparent plate, allowing all the laser beam reflected by the optical disk 6 to enter the photoreceptor 8. With this, at the time of DVD reproduction, the objective lens 5 is used throughout its surfaces.

Therefore, DVDs can be effectively reproduced by setting the numerical aperture NA of the objective lens at, e.g. 0.6, which is an appropriate value for that purpose, where the laser beam wavelength is 650 nm.

(2) At the Time of CD Reproduction

At the time of CD reproduction, the LCD panel control circuit 10 (see FIG. 1) receives the CD selection signal as the disk selection signal SSEL.

When having received this CD selection signal, the LCD panel control circuit 10 shortcircuits the lower side transparent electrode 302b of the LCD panel 3 (see FIG. 4B) to ground, i.e. the earth potential.

On the other hand, as for the upper side transparent electrode 302a (see FIG. 4A), that circuit 10 applies voltage, e.g. 3.5V, onto the middle-part circular pattern 302a1 and, at the same time, shortcircuits the surrounding circumferential pattern 302a2 to ground (the earth potential).

This middle-part circular pattern 302a1 onto which 3.5B is applied undergoes the same actions as those at the time of DVD reproduction, thereby acting as a simple transparent plate.

Therefore, the reflected beam passing through this middle-part circular pattern 302a1 is all reflected by the polarization beam splitter 2 into the horizontal direction in the same way as in the abovementioned case of DVDs and then reaches the photoreceptor 8.

On the other hand, the circumferential pattern 302a2 surrounding this circular pattern is shortcircuited to ground (the earth potential), so that no crystal molecules in this pattern are subject to an electric field.

Therefore, the crystal molecules in this circumferential pattern 302a2 still stay as twist-oriented. As a result, the laser beam, after passing through this circumferential pattern 302a2, has its polarization plane rotated along those twisted crystal molecules M and then enters the divided-by-4 wavelength plate 4.

When having entered the divided-by-4 wavelength plate 4 via the circumferential pattern 302a2, its polarization plane is oriented into almost the same direction as the crystal axis Pc of the divided-by-4 wavelength plate 4, so that the laser beam passes through the divided-by-4 wavelength plate 4 almost without receiving its actions and is reflected by the information recording surface of the disk 6 and then enters the divided-by-4 wavelength plate 4 again.

When having entered this divided-by-4 wavelength plate 4, the reflected beam, as linearly polarized, passes through that plate 4 without receiving its actions and then enters the LCD panel 3.

During passing through the LCD panel 3, this reflected beam consisting of linearly polarized light has its polarization plane rotated along the twisted orientation of the liquid crystal molecules M, so that upon leaving that panel 3, the polarization plane of the reflected light is in almost the same polarization direction as the polarization plane P of the original laser beam B. Therefore, the laser beam which has been reflected by the disk 6 via the circumferential pattern 302a2 of the LCD panel 3 would pass through the polarization beam splitter 2 as it is, thus not entering the photoreceptor 8.

Thus, by permitting, at the time of CD reproduction, only the middle-part circular pattern 302a1 of the LCD panel 3's transparent electrode 302a to act as a transparent plate, it is possible to cause only the laser beam which has passed through this circular pattern to enter the photoreceptor 8.

This is equivalent to the case where portion of the laser beam, passing through the objective lens 5, which has passed through the circumferential part of lens having a large aberration, is cut off. That is, this scheme enjoys the same effects as the case where the aberration is compensated.

Therefore, by setting the geometry of the abovementioned circular pattern 302a1 so that the apparent numerical aperture NS in this case may be a value, e.g. NA=0.37 where the laser beam wavelength is 650 nm, suitable for the reproduction of CDs, it is possible to reproduce CDs in a compatible way by using the same optical pickup as that for DVDs.

(3) At the Time of Tilt Compensation

It is enough to perform tilt compensation only in the case of reproducing DVDs, which have an extremely high recording density and have little tilt margin, so that it is not necessarily needed in the case of CD reproduction.

Therefore, the following description is made with reference to the case of reproducing DVDs. To perform tilt compensation also in the case of CD reproduction, it is enough to set the voltage application conditions for CD reproduction as mentioned in the above item (2) and then control the application voltage for tilt compensation onto the circular openings in much the same way as for DVDs mentioned below. When a wave-front aberration which occurs upon the tilting (inclining) of the optical disk 6 is a comatic aberration as shown in FIG. 6 or 7, it must be possible to eliminate the wave-front aberration due to tilting by, as shown in FIG. 8, giving an opposite-directional phase difference such as given by the dotted line to the liquid crystal molecules given at a location corresponding to the wave-front aberration which has occurred.

Thus, an optical pickup according to this embodiment will eliminate the abovementioned wave-front aberration, based on the following principles.

Figure 5:
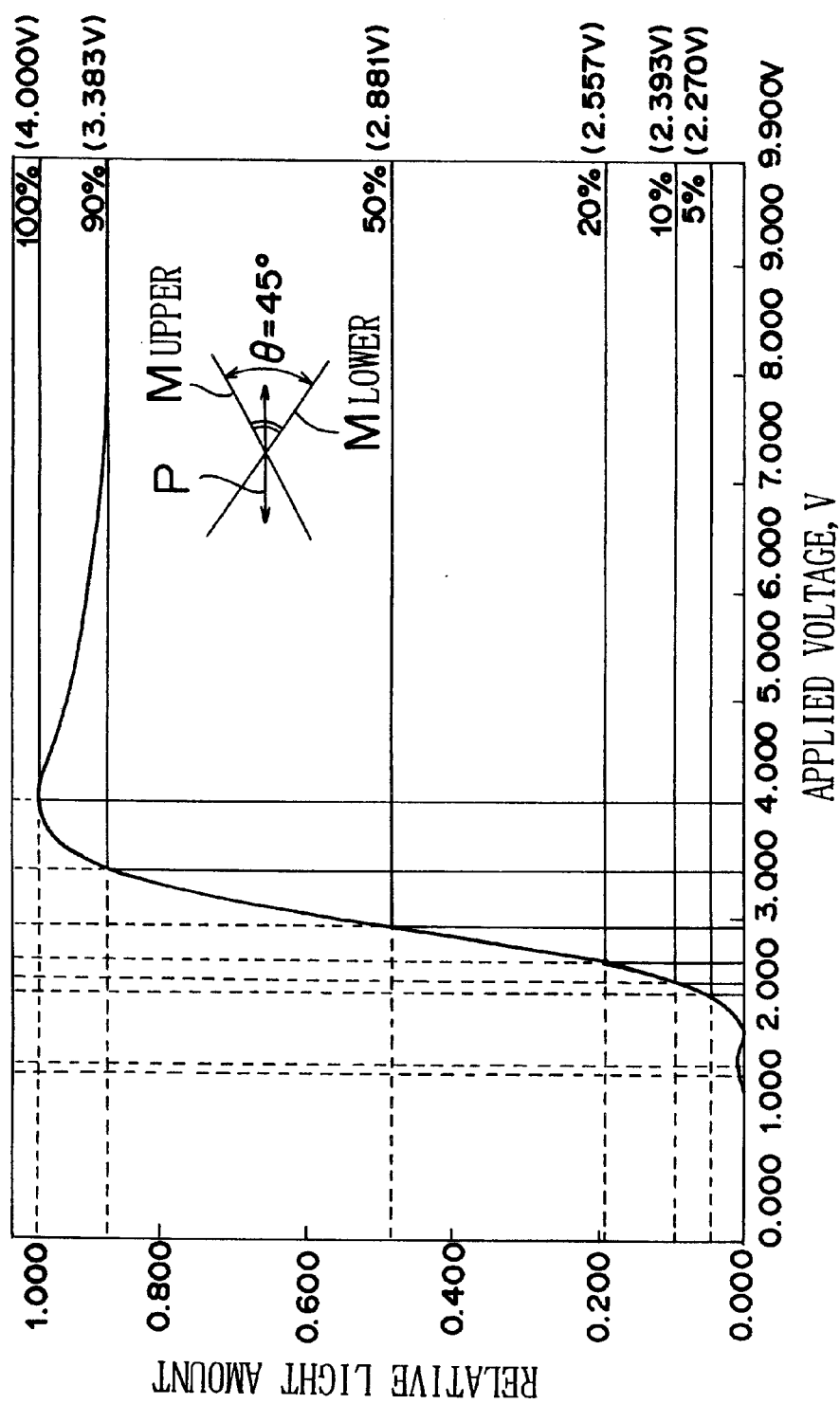
FIG. 5 is a diagram showing the light reception characteristics of a photoreceptor as against voltage applied onto the LCD panel.

That is, as can be seen from the photoreceptive characteristics shown in FIG. 5, the amount of light received would change to some extent with changing application voltage even in a range above 3.5V, where the LCD panel 3 acts as a transparent plate. This means that the liquid crystal molecules are still oriented as a little tilted, staying away from the complete perpendicular orientation state.

Thus, by changing and controlling the application voltage in a range of 3.5V and above, where this LCD panel 3 almost acts as a transparent plate, so that the liquid crystal molecules M may be oriented accordingly, it is possible to change the double refraction, delta n, of those molecules M.

Therefore, it is possible to give the following phase difference, delta P, to the passing laser beam.

$$\Delta P = \Delta n \cdot d (2\pi/\lambda)$$

where d is the thickness of the liquid crystal cell and lambda, the laser beam wavelength.

That is, by giving a phase difference delta P to the laser beam, it is possible to make the effective optical path length equal to that with the case where the optical disk 6 is not tilted and therefore to compensate an aberration which has occurred, i.e. a resultant tilt.

The concrete operations of tilt compensation are described below.

A tilt, if any at the optical disk 6, is detected by the tilt sensor 9 (see FIG. 1), which then sends out the tilt detection signal STLT to the LCD panel control circuit 10.

Based on this tilt detection signal STLT, the LCD panel control circuit 10 shortcircuits the total surfaces of the upper side transparent electrode 302a (see FIG. 4A) to ground (the earth potential) sad, at the same time, changes and controls the application voltage of 3.5V or above according to a tilt angle corresponding to the tilt detection signal STLT to be applied onto the patterns 302b1 through 302b5 of the lower side transparent electrode 302b (see FIG. 4B), to give each of those patterns such a phase difference as indicated by the dotted line in FIG. 8. Thus, it is possible to eliminate such wave-front aberrations (comatic aberrations) as indicated by the solid line in FIG. 8 so that the tilt may be compensated.

Figure 9:
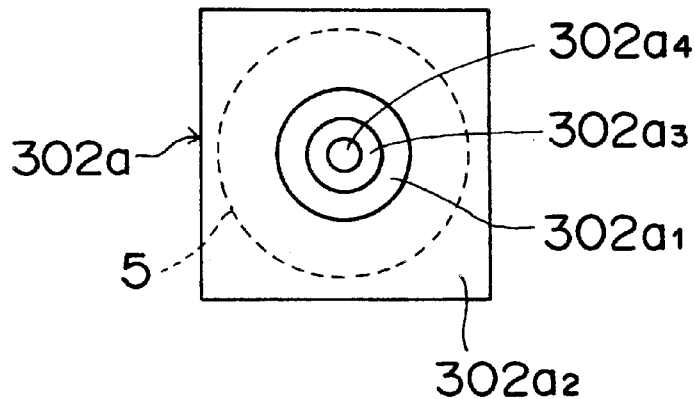
FIG. 9 is a diagram showing another example of the pattern of an electrode for DVD/CD changing.

FIG. 9 shows another example of electrode patterns formed on the upper side transparent electrode 302a of the LCD panel 3. In this example, to compensate wave-front aberrations, mainly spherical aberrations, which occur during the reproduction of CDs having a large thickness, the transparent electrode 302a has the same circular pattern 302a1 as that shown in FIG. 4A inside of which is divided into a plurality of (three in the figure) concentric circles, i.e. electrode patterns 302a1, 302a3, and 302a4, so that the voltage applied onto those electrode patterns may be changed to give appropriate phase differences in order to eliminate the wave-front aberrations.

That is, as mentioned earlier, an optical pickup according to the present invention uses the objective lens 5 whose geometry is designed to fit the reproduction of the DVD, each plate of which is as thick as 0.6 mm, having a large disk thickness, to decrease the numerical aperture NA of this objective lens 5 equivalently by utilizing the LCD panel 3 and the divided-by-4 wavelength plate 4, so that the CDs having a small value of NA may also be reproduced in a compatible way. As a result, at the time of the reproduction of CDs having a large thickness of 1.2 mm, wave-front aberrations such as shown in FIG. 10 would occur.

Figure 10:
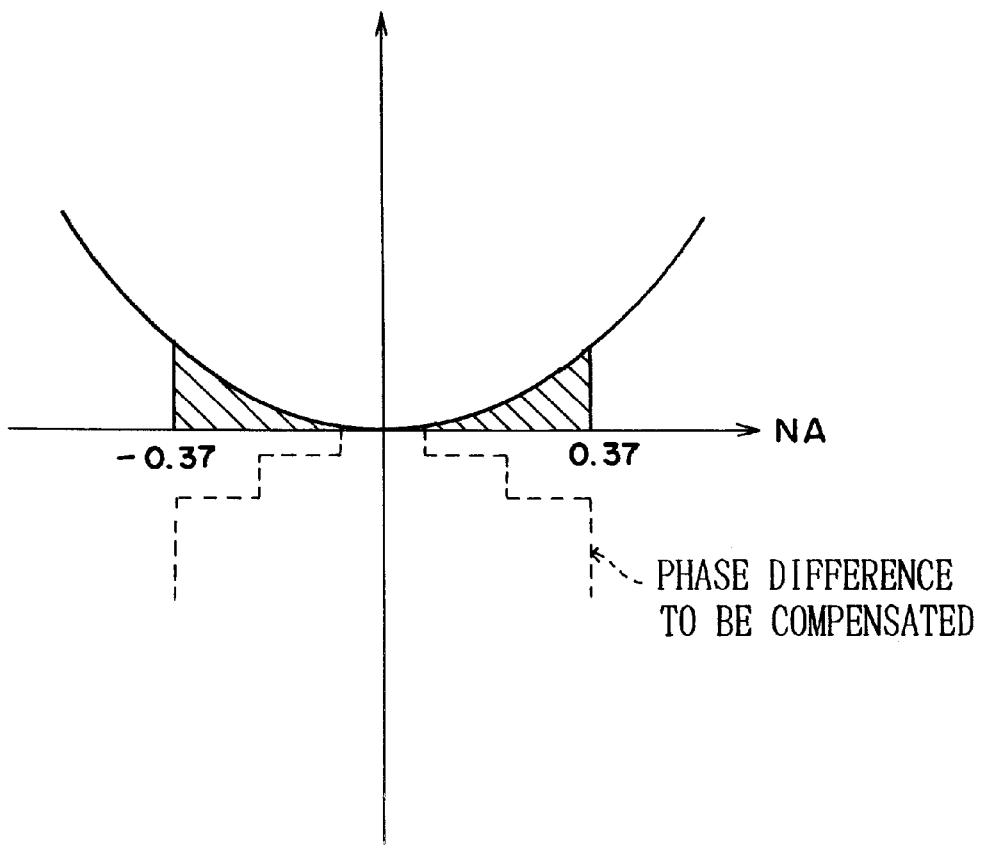
FIG. 10 is a diagram showing the wave-front aberration, spherical one, occurring upon CD reproduction.

The wave-front aberrations due to the difference in the disk thickness mainly consist of spherical aberrations, thus providing an axis-symmetrical curve with respect to the ordinate as shown in FIG. 10.

Therefore, at the time of CD reproduction, by giving an opposite-directional phase difference as indicated by the dotted line to the liquid crystal molecules at a location which corresponds to the LCD panel 3, it is possible to eliminate wave-front aberrations due to differences in the disk thickness.

To this end, in such a state that the transparent electrode 302a having such an electrode pattern as shown in FIG. 8 is used to apply, during CD reproduction, voltage of 3.5V or above only onto the concentric-circle electrode patterns 302a1, a 302a3, and 302a4 to provide transparency, this voltage would be changed and controlled in a range of 3.5V and above to give those electrode patterns the phase differences as indicated by the dotted line in FIG. 10.

As a result, the wave-front aberration, i.e. spherical aberration, indicated by the solid line in FIG. 10 can be eliminated, to improve the CD reproduction capacity.

As mentioned earlier, in an optical pickup according to this embodiment, the twist angle, theta, of the LCD panel 3 is defined at an angle of 15 degrees to 60 degrees and, moreover, the linear polarization plane P of the laser beam which enters this LCD panel 3 is also defined so as to come within this twist angle, theta, because of the following reasons (1) through (3).

Reason (1)

Figure 11:
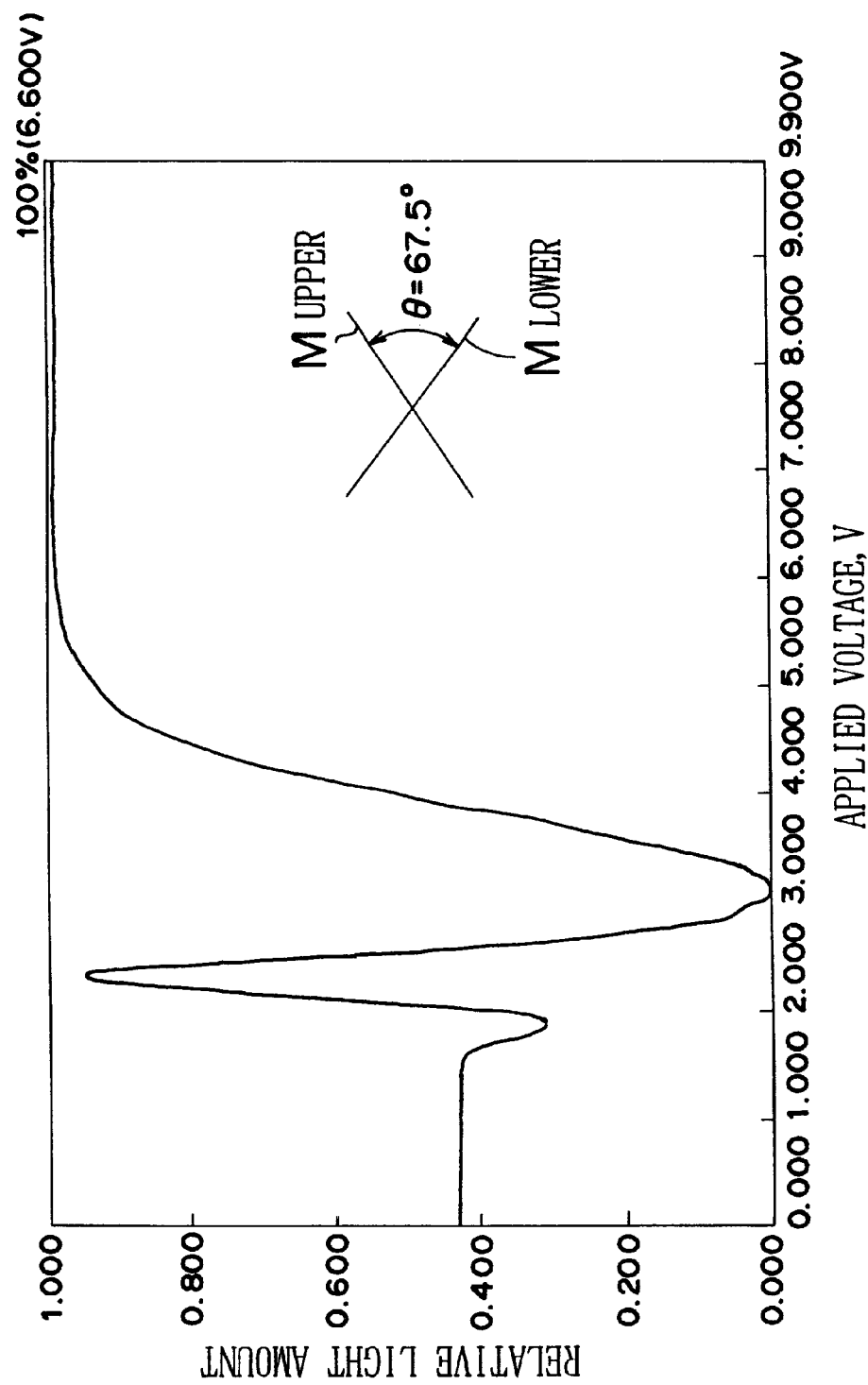
FIG. 11 is a diagram showing the light reception characteristics in the case where the twist angle of an LCD panel is rather large.

FIG. 11 shows an example the photoreceptive characteristics in the case where the twist angle, theta, is set at 67.5 degrees.

That is, as shown in FIG. 11, a twist angle theta above 60 degrees would change the beam amount too much, so that the amount is reduced to zero only at a point where the application voltage is 3V, making it extremely difficult to use.

Moreover, high voltage of approximately 5V or above is needed to provide transparency, where almost no phase differences would occur, making it impossible to compensate the tilt angle.

Therefore, it is necessary to set, in practice, the twist angle theta of the LCD panel 3 at an angle of 60 degrees or less.

Reason (2)

Figure 12:
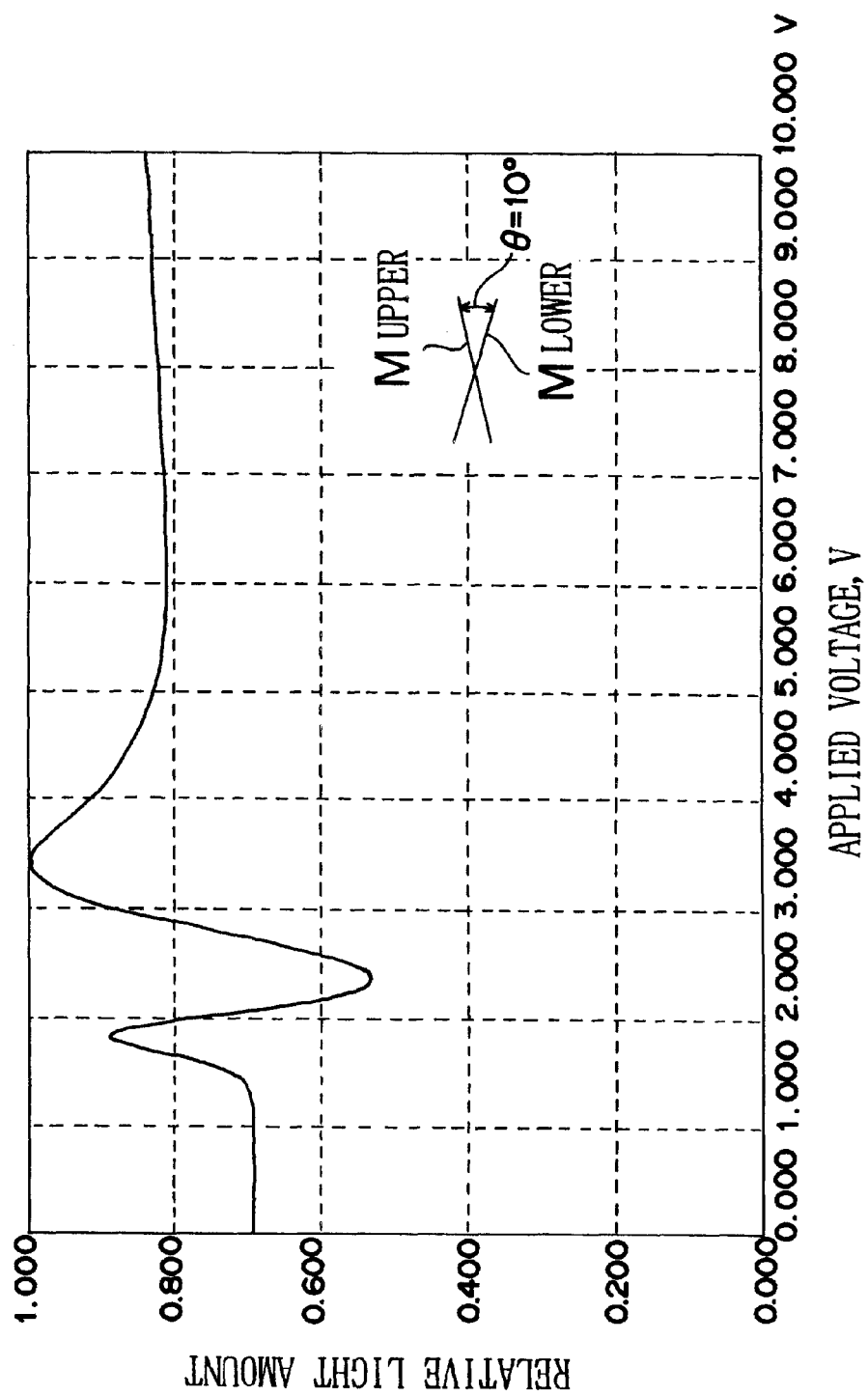
FIG. 12 is a diagram showing the photoreceptive characteristics in the case where the twist angle of an LCD panel is rather small.

FIG. 12 shows an example of the photoreceptive characteristics in the case where the twist angle theta is set at 10 degrees.

As can be seen from this example in FIG. 12, when the twist angle theta is below 15 degrees, in a transparency range with voltage of 3.5V or above, some phase differences can be obtained but the rotation of the polarization plane because of twisting is too small, so that there is no voltage which would give zero beam amount, making it impossible to switch between DVDs and CDs.

Therefore, it is necessary to set, in practice, the twist angle theta of the LCD panel 3 at an angle of 15 degrees or above.

Reason (3)

Figure 13:
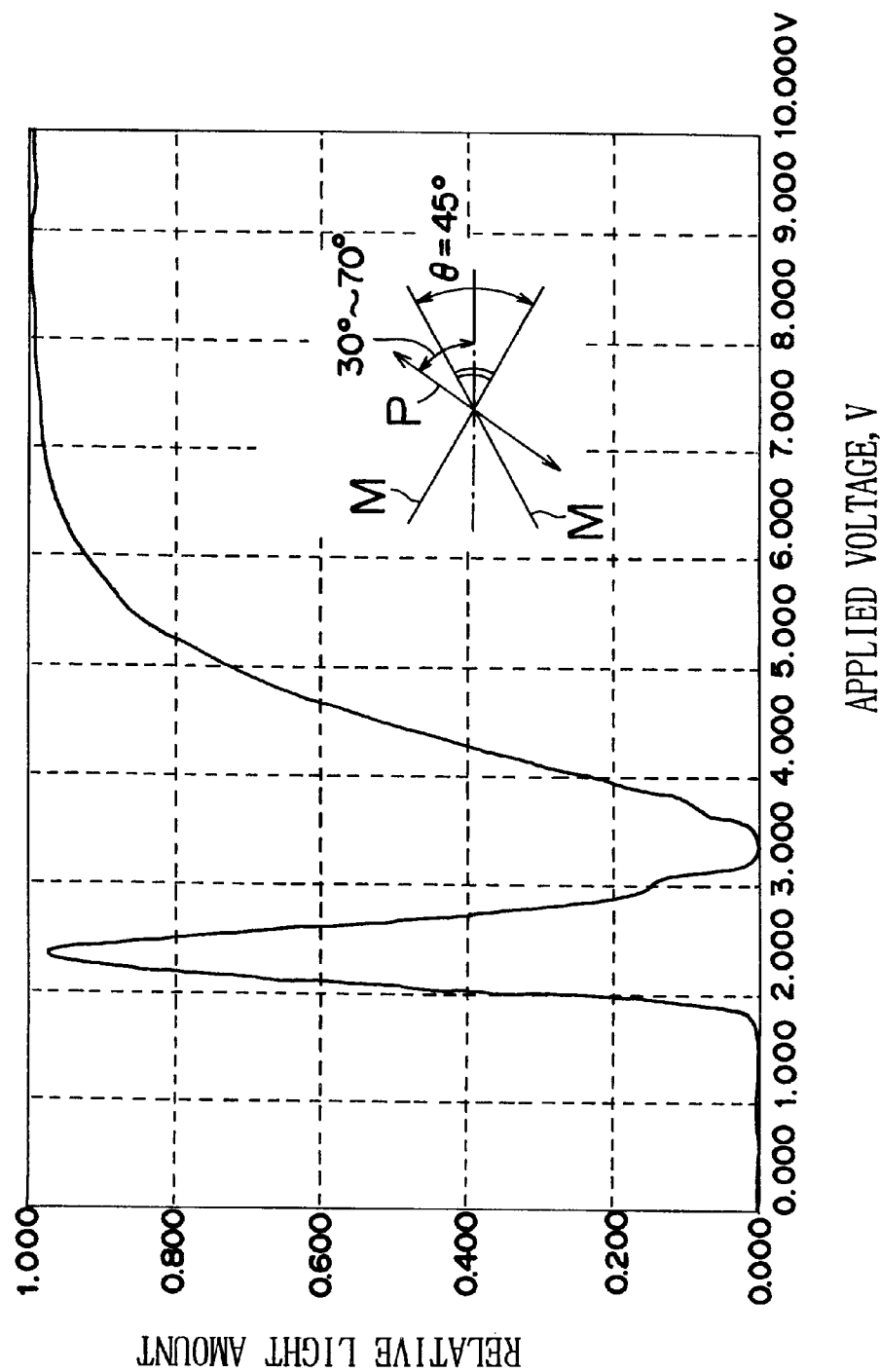
FIG. 13 is a diagram showing the photoreceptive characteristics in the case where the laser beam polarization plane is not set within a twist angle of the LCD panel.

FIG. 13 shows an example of the photoreceptive characteristics in the case where the twist angle theta is set at 45 degrees and the angle of the polarization plane P is set at an angle of 30 degrees to 70 degrees with respect to the central twist line.

As shown in FIG. 13, if the polarization plane P of the laser beam which enters the LCD panel 3 is not within a twist angle theta of this panel 3, the beam amount would fluctuate so much, that it is difficult to use in a stable manner as in the case shown in FIG. 11.

Therefore, it is necessary to set the polarization plane P of laser beam within the twist angle theta of the LCD panel 3.

Modification of First Embodiment

Figure 14:
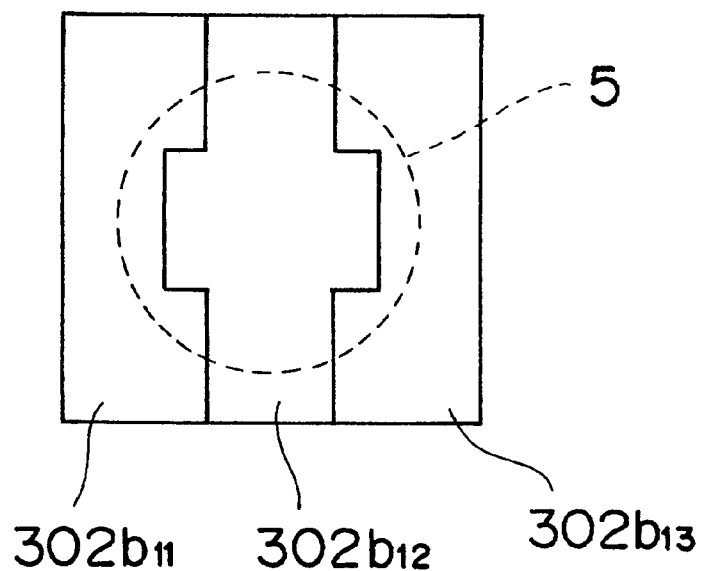
FIG. 14 is a diagram showing a modification of the embodiment.

Although the abovementioned first embodiment employs a divided-by-5 electrode as a tilt compensation electrode (see FIG. 4B), to carry out simpler compensation, a divided-by-3 electrode such as shown in FIG. 14 can be used as the tilt compensation electrode.

In this case, an electrode pattern 302b11 of the divided-by-3 electrode corresponds to the electrode pattern 302b1, an electrode pattern 302b12 corresponds to a combination of the electrode patterns 302b2 through 302b4, and an electrode pattern 302b13 corresponds to the electrode pattern 302b5 of the divided-by-5 electrode.

Figure 15:
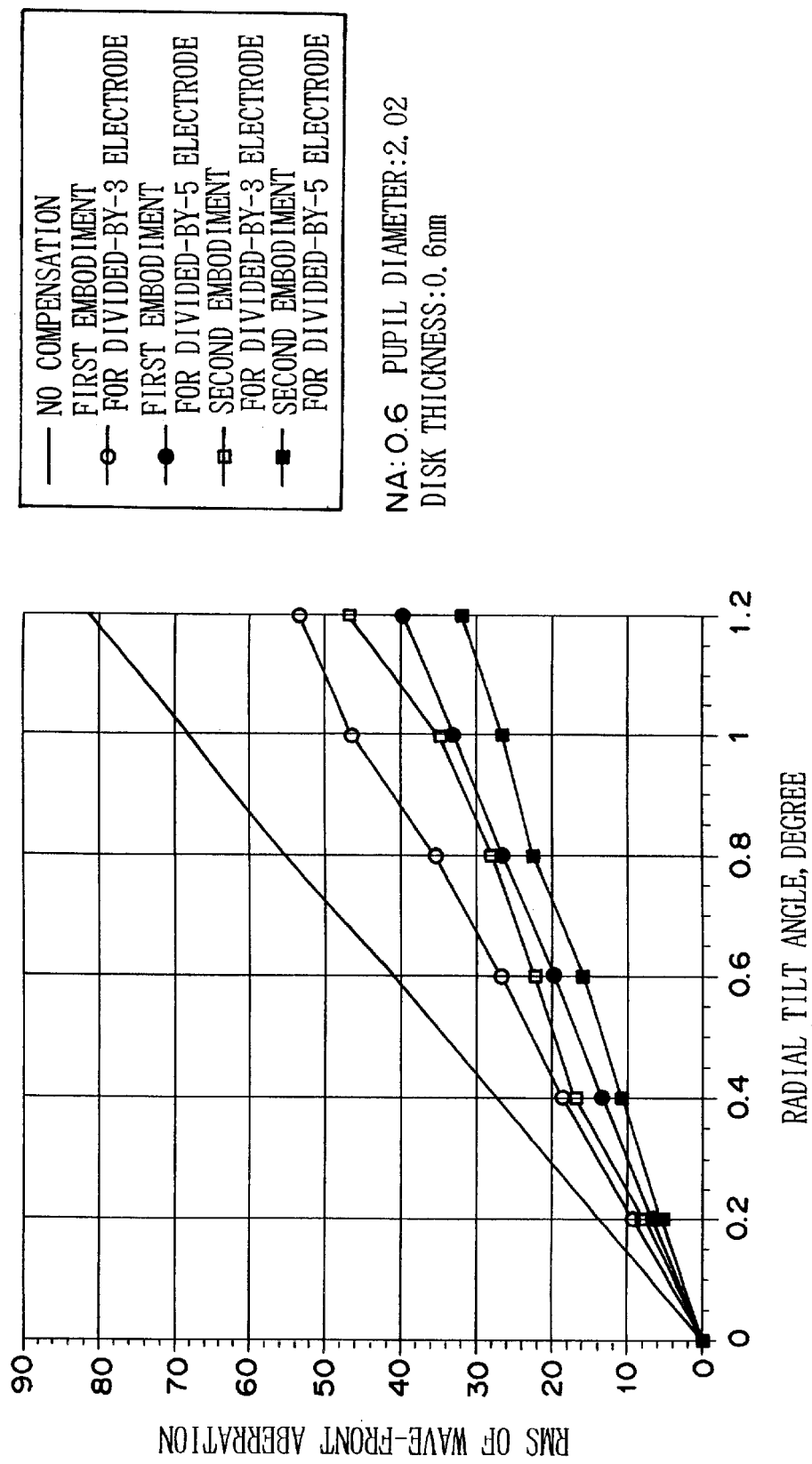
FIG. 15 is a diagram showing the effects of wave-front aberration compensation according to the embodiment.

FIG. 15 shows the effects of compensating wave-front aberrations due to a tilt of the optical disk in this embodiment.

As shown in FIG. 15, the first embodiment will reduce the influences by the wave-front aberrations in both cases of a divided-by-5 electrode indicated by the filled-circle solid line in FIG. 15 and a divided-by-3 electrode indicated by the empty-circle solid line in the same figure more than the case of no compensation indicated by the solid line in the same figure.

Although the first embodiment has been described only with reference to the case where the information recorded on optical disks is read out, it is also possible to apply this embodiment to such an optical system that necessary information is written onto those optical disks in the same manner.

As can be seen from the above description, the first embodiment uses one sheet of LCD panel to compensate both spherical aberrations due to differences in the substrate thickness of optical disks and comatic aberrations due to tilts of the optical disks, so that necessary information may be read out and written in surely.

Although the abovementioned first embodiment has such a structure as to compensate both wave-front aberrations due to differences in the substrate thickness of optical disks and those due to tilts of the optical disks, such a structure as not to divide an optical disk switching electrode pattern would enable compensating only the wave-front aberrations due to tilting, while such a structure as not to divide a tilt compensating electrode pattern would enable compensating only the wave-front aberrations due to optical disk switching.

If, oppositely, the number of dividing an electrode pattern is increased, the number of the types of the corresponding disks, i.e. the types of the corresponding disk substrate thickness, will also be increased, so that more correct compensation of tilts may be possible.

Second Embodiment

Although the abovementioned first embodiment has assumed an idealistic Gaussian optical system, it is not always possible to handle an actual optical system as something which meets the conditions of the Gaussian optical systems.

An explanation will be given of the compensation theory of the wave-front abberation due to the tilt angle of the optical disk according to the second embodiment.

Now it is assumed that the wave-front abberation of the pupil face of an objective lens is represented by $W(r, \phi)$, and $(r, \phi)$ represents a polar coordinate of the pupil face.

When the optical disk tilts from the optical axis, the tilt angle occurs, the wave-front abberation (mainly, comatic abberation) occurs. Thus, the laser beam cannot be converged by the objective lens. In this case, the main component of the wave-front abberation $W\ TLT(r, \phi)$ due to the tilt angle can be expressed by $$W\ TLT(r, \phi) = \omega_{31} r^3 \cos\phi + \omega_{11} r \cos\phi \quad (1)$$

where $\omega_{31}$ and $\omega_{11}$ are constants represented by the tilt angle of the optical disk, substrate thickness, substrate refraction coefficient and NA. The constant $\omega_{31}$ represents the comatic abberation and the contstant $\omega_{11}$ represents the abberation due to movement of an image point. The wave-front abberation distribution on the pupil face computed using Equation (1) is shown in FIG. 7 described later.

Assuming that the standard deviation of the wave-front $W(r, \phi)$ on the pupil face is Wrms, Wrms can be expressed by Equation (2) described in FIG. 6.

$$W_{rms} = \sqrt{\frac{\iint (W(r, \phi) - W_0^2) r d r d \phi}{\pi}} \quad (2)$$

where W0 represents the average value of the pupil face of $W(r, \phi)$.

The standard deviation Wrms is used to evaluate the wave-front abberation. Reducing Wrms leads to improved reproduction with less influence from the wave-front abberation. As seen from Equation (2), the wave-front abberation can be compensated for by reducing $W(r, \phi)$.

In order to compensate for $W\ TLT(r, \phi)$ due to the tilt of the optical disk, as shown in FIG. 1, the liquid crystal panel 3 is arranged between the laser beam source 1. If the voltage applied to each divide area is controlled to change the refraction coefficient of a certain divided area by $\Delta n$, the laser beam passing the divided area is given by an optical-path difference $\Delta n \cdot d$. Assuming that the optical difference given over the entire liquid panel is represented by $W\ LC(r, \phi)$, the wave-front abberation $W(r, \phi)$ on the pupil face of the objective lens when the liquid crystal panel is arranged can be expressed by $$W(r, \phi) = W\ TLT(r, \phi) + W\ LC(r, \phi) \quad (3)$$

As apparent from Eqaution (3), the wave-front abberation $W(r, \phi)$ due to the tilt angle of the optical disk can be cancelled by the condition:

$$W(r, \phi) = W\ TLT(r, \phi) + W\ LC(r, \phi) = 0$$

i.e. by giving the wave-front abberation $(W\ LC(r, \phi) = -W\ TLT(r, \phi))$ having an opposite polarity to the wave-front abberation $W(r, \phi)$ due to the tilt angle of the optical angle by the liquid crystal panel 3. This can be accomplished by dividing the liquid crystal panel 3 into plural areas correspondingly to the wave-front abberation due to the tilt angle of the optical disk shown in FIG. 16, and contolling the voltage to be applied to each area so as to give the wave-front abberation having the opposite polarity to the wave-front abberation due to the tilt angle.

With this, the second embodiment assumes an ordinary optical system whose lens focus is the best image point.

Here, the best image point refers to a practical convergence center in the case where wave-front aberrations are taken into account, i.e. an area where those aberrations are reduced to a minimum.

Figure 16:
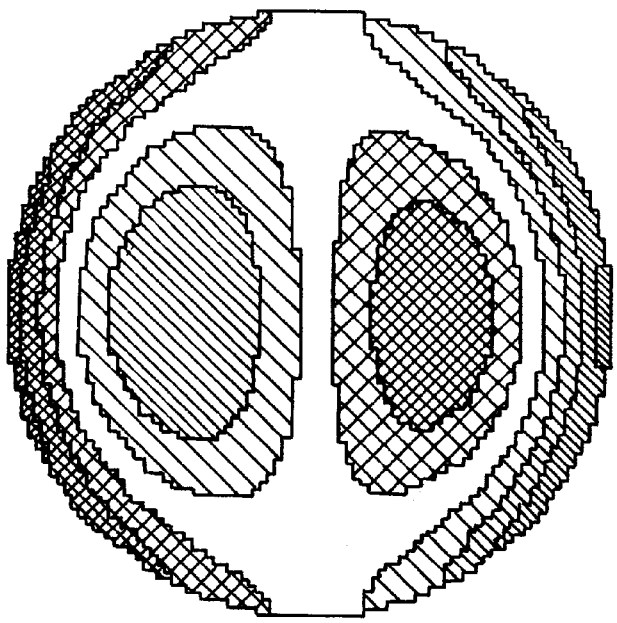
FIG. 16 is a diagram (1) showing the wave-front aberration distribution at the best image point according to the second embodiment.

FIG. 16 shows a wave-front aberration distribution on the recording surface of the optical disk 6 in the case where the tilt (inclination) of the optical disk 6 is 1 (one) degree, the numerical aperture NA of the objective lens 5 is set at 0.6, and the thickness of the optical disk 6's substrate is 0.6 mm, corresponding to the DVD specifications.

Figure 17:
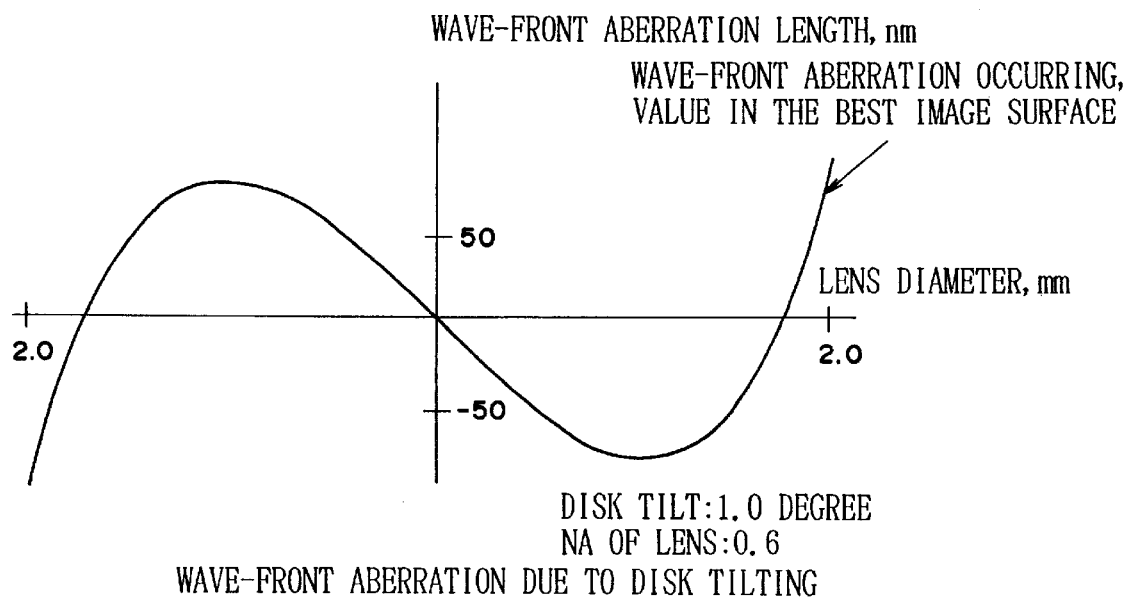
FIG. 17 is a digram (2) showing the wave-front aberration distribution at the best image point according to the second embodiment.

Also, FIG. 17 shows a wave-front aberration distribution on the recording surface of the optical disk 6 at the best image point.

This distribution is equivalent to that in the case where both the wave-front aberration axis, i.e. ordinate, and the lens diameter axis, i.e. abscissa, of the wave-front aberration curve shown in FIG. 7 are rotated.

As can be seen from this, the wave-front aberrations, mainly comatic aberrations, which occur upon tilting (inclining) of the optical disk 6, are axis-symmetrical with respect to the image center as shown in FIGS. 16 and 17.

From those points of view, this second embodiment also rotates by a prescribed angle the polarization plane of either portion, of the laser beam which has entered the LCD panel 3, which is not used to read out recorded information or another portion used to do so, in order to control the apparent numerical aperture of the objective lens 5 so that only the laser beam of the portion used to read out the recorded information may be applied onto the optical disk 6 and, at the same time, change by a prescribed length the optical path of that portion of the laser beam whose wave-front aberrations are in excess of a standard value, i.e. separately control the voltage applied onto each of the electrode patterns of the LCD panel 3 by using the LCD panel control circuit 10, so that the wave-front aberrations at the best image point may be compensated, thus simultaneously enabling both DVD/CD switching and disk tilt compensation.

Since the second embodiment also carries out the same operations of disk switching, only the pick up operations at the time of tilt compensation are described with reference to the operational principles shown in FIG. 18.

Figure 18A:
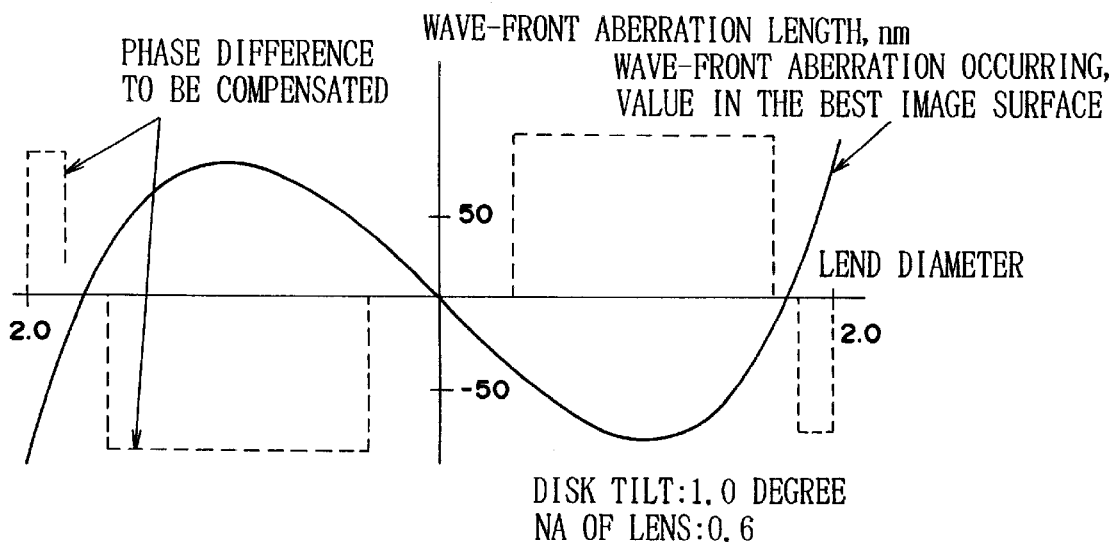
FIGS. 18A and 18B are explanatory diagrams showing wave-front aberration compensation according to the second embodiment.
Figure 18B:
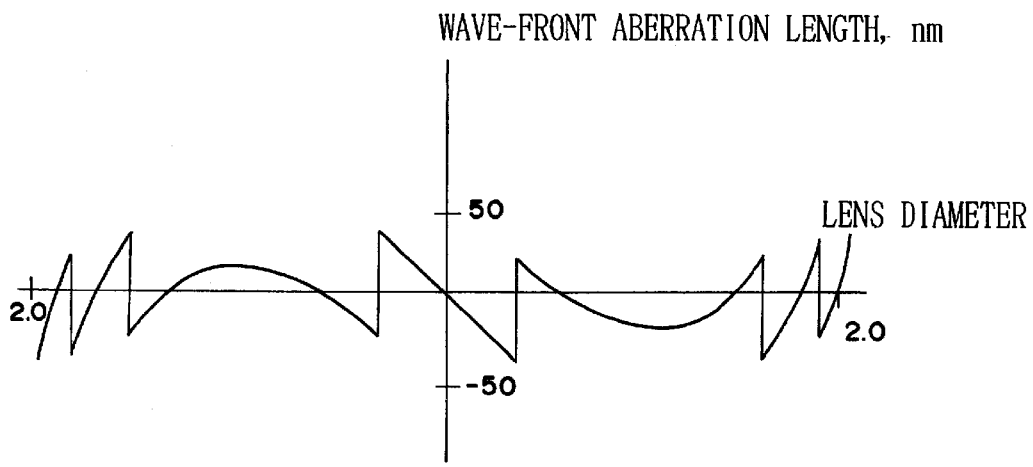

When the wave-front aberrations occurring upon tilting (inclining) of the optical disk 6 mainly consist of comatic aberrations as shown in FIG. 17, it is possible to eliminate those aberrations due to tilting by giving an opposite-directional phase difference as indicated by the dotted line to liquid crystal molecules located at a position which corresponds to the wave-front aberrations which have occurred, as shown in FIG. 18A.

Figure 19:
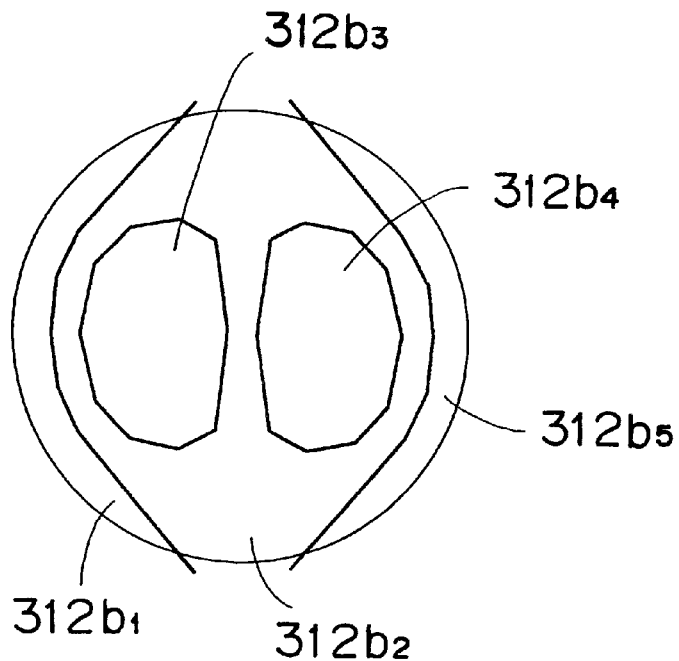
FIG. 19 is an explanatory diagram showing an electrode pattern (divided-by-5 electrode pattern) according to the second embodiment.

With this, as shown in FIG. 19, in place of the lower-side transparent electrode 302b of the first embodiment (see FIG. 4B), the transparent electrode 312b having divided-by-5 electrode patterns 312b1 through 312b5 corresponding to the wave-front aberration distribution (see FIG. 16) is employed to apply a value of voltage corresponding to this distribution onto the LCD panel 3.

In this case, the region corresponding to the electrode pattern 312b1 and that corresponding to the electrode pattern 312b5 have almost the same aberrations although their orientations are different, so that the region corresponding to the electrode pattern 312b3 and that corresponding to the electrode pattern 312b4 have almost the same aberrations although their orientations are different. Therefore, the voltage of only two patterns of the divided-by-5 electrode must be controlled because the electrode pattern has a fixed voltage to be controlled, facilitating control.

Also by changing and controlling the voltage applied onto each of the electrode patterns 312b1 through 312b5 in a voltage range of 3.5V and above where the LCD panel 3 acts as an almost transparent plate, the orientation state of liquid crystal molecules M varies accordingly to change the double refraction of those molecules by delta n, so that a phase difference delta P given by the following equation can be given to the passing laser beam and also that the actual optical path length can be made equal to that in the case with no tilting of the optical disk 6, thus enabling compensating the aberrations which have occurred, i.e. tilts.

$$\Delta P = \Delta n \cdot d (2\pi/\lambda)$$

where d is a thickness of liquid crystal cells and lambda is the wavelength of the beam. Next, the concrete operations of tilt compensation are described below.

When a tilt occurs at the optical disk 6, it is detected by the tilt sensor 9 (see FIG. 1), which in turn sends out the tilt detection signal STLT to the LCD panel control circuit 10.

Based on the tilt detection signal STLT, the LCD panel control circuit 10 shortcircuits the total surfaces of the upper side transparent electrode 302a (see FIG. 4A) to ground, i.e. the earth potential, and, at the same time, changes and controls voltage in a range of 3.5V or above according to a tilt which corresponds to the tilt detection signal STLT to be applied onto each of the electrode patterns 312b1 through 312b5, so that a phase difference as indicated by the dotted line in FIG. 18A can be given to each of those patterns. With this, the wave-front aberrations, i.e. comatic aberrations, indicated by the solid line in FIG. 18A will be eliminated, thus enabling tilt compensation.

Modification of Second Embodiment

Figure 20:
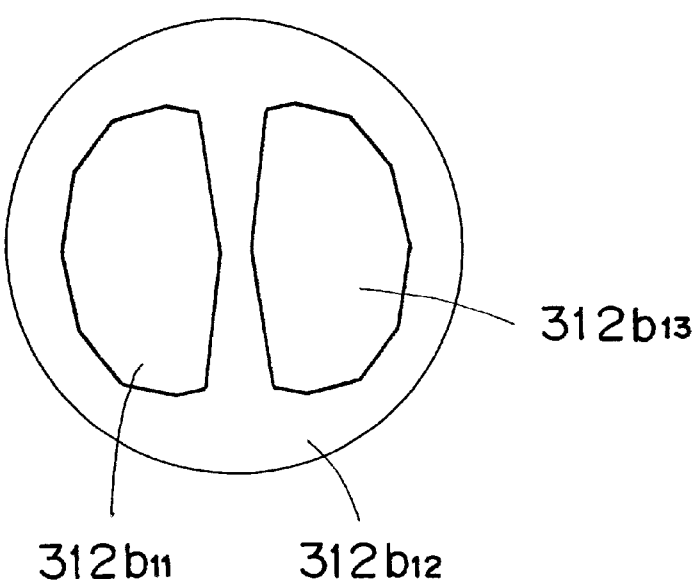
FIG. 20 is a diagram (1) showing a modification of the second embodiment.
Figure 21A:
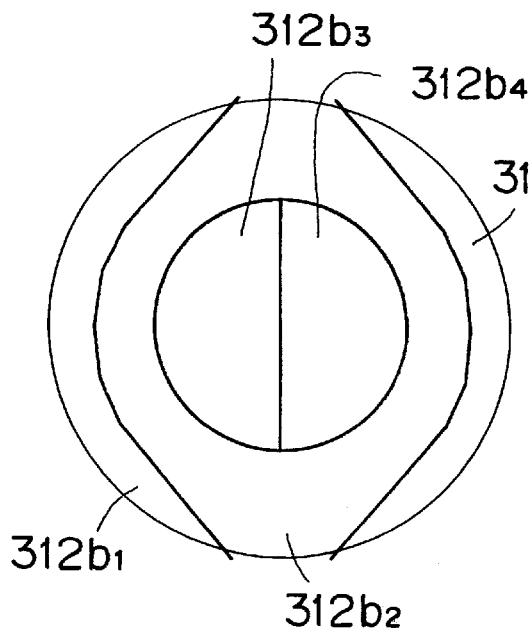
FIGS. 21A to 21D are diagrams (2) showing modifications of the second embodiment.
Figure 21B:
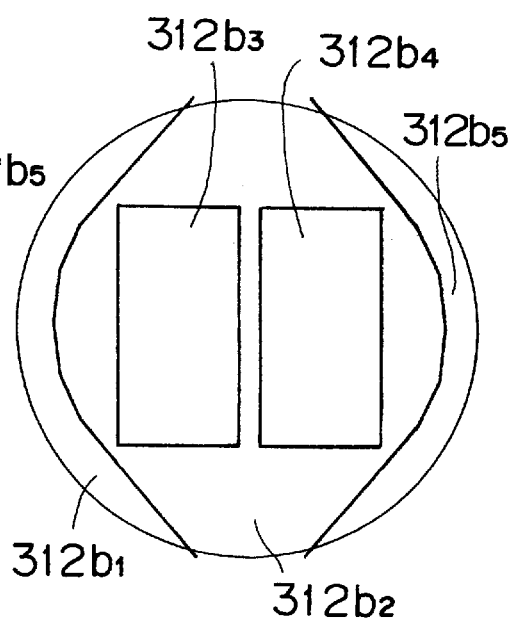
Figure 21C:
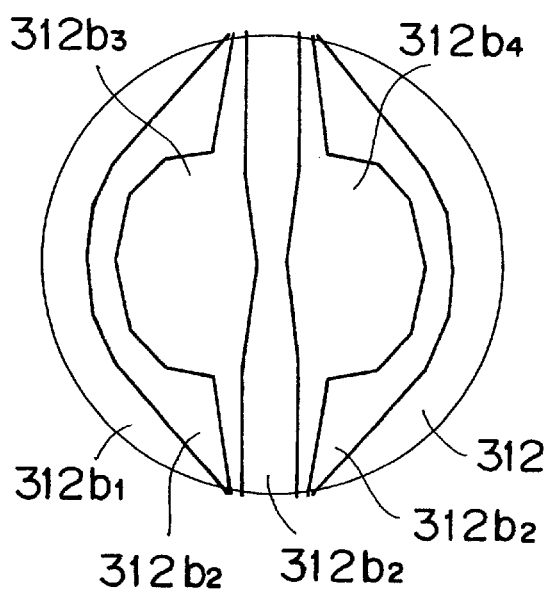
Figure 21D:
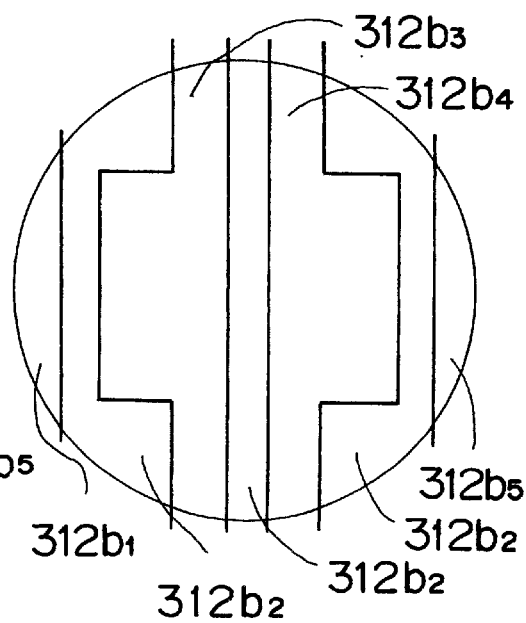

Although the abovementioned second embodiment employs a divided-by-5 electrode as the tilt compensation electrode (see FIG. 19), in carrying out compensation more easily, it is also possible to use, as shown in FIG. 20, a divided-by-3 electrode having the electrode patterns 312b11 through 312b13 as the tilt compensation electrode.

As can be seen from FIG. 15, the second embodiment will reduce, even in comparison to the case of the first embodiment, the influences by the wave-front aberrations in both cases of a divided-by-5 electrode indicated by the filled-square solid line in FIG. 15 and a divided-by-3 electrode indicated by the empty-square solid line more than the case of no compensation indicated by the solid line.

Although the second embodiment has been described with reference to the case where information recorded on optical disks is read out, it can be applied also to such an optical system as to record necessary information in the same manner.

As described above, the second embodiment uses one sheet of LCD panel to compensate both spherical aberrations due to differences in the substrate thickness of the optical disk at the best image point and comatic aberrations due to a tilt of the optical disk, thus securely enabling read-out and write-in of necessary information.

Although the second embodiment also has such a structure as to compensate both wave-front aberrations due to differences in the substrate thickness of the optical disk and those due to a tilt of the optical disk, such a structure as not to divide the disk switching electrode pattern would enable only compensating the wave-front aberrations due to tilts, while such a structure as not to divide the tilt compensation electrode pattern would enable only the compensation of the wave-front aberrations due to optical disk switching.

If, oppositely, the number of dividing the electrode pattern is increased, the number of the types of the corresponding disks, i.e. the types of the corresponding disk substrate thickness, is increased, so that more correct tilt compensation may be possible.

FIG. 21 shows another example of a divided-by-5 electrode pattern formed as the lower-side transparent electrode 312b of the LCD panel 3.

It is to be noted that in FIG. 21, the same and similar reference numerals are applied to the same and similar parts such as given in FIG. 19, and the detailed description of the same and similar parts will be omitted. Those electrode patterns will also give the same effects as the abovementioned embodiments.

Figure 22A:
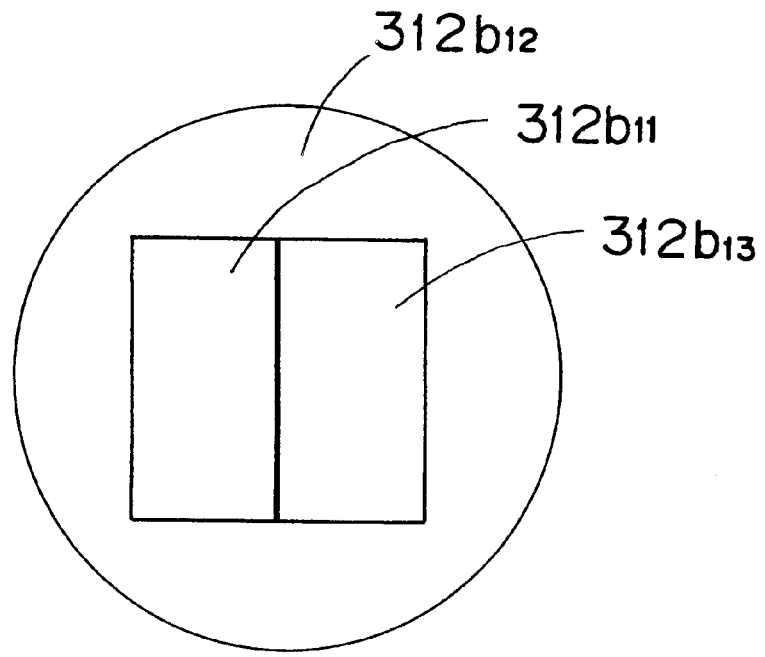
FIGS. 22A and 22B are diagrams (3) showing modifications of the second embodiment.
Figure 22B:
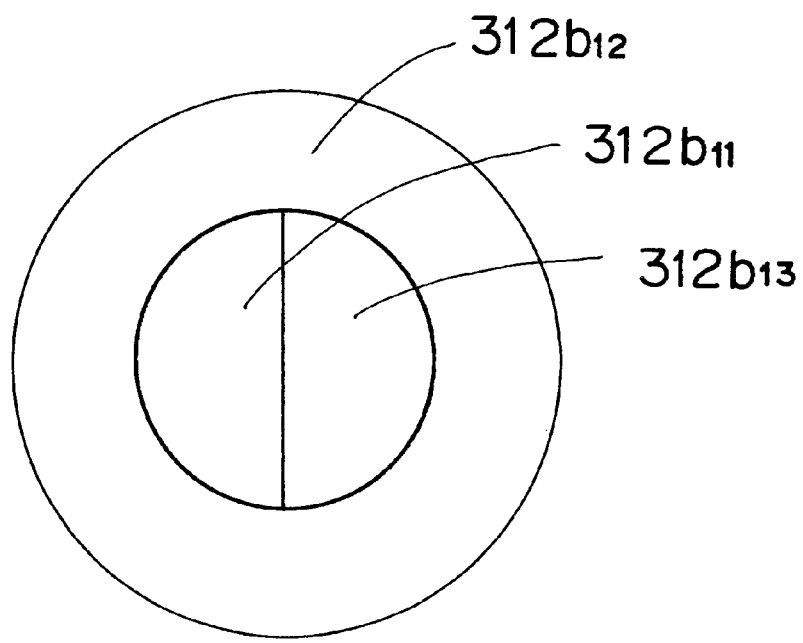

FIG. 22 shows another example of the divided-by-3 electrode pattern formed as the lower-side transparent electrode 312b of the LCD panel 3.

It is to be noted that in FIG. 22, the same and similar reference numerals are applied to the same and similar parts such as given in FIG. 20, and the detailed description of is omitted.

Those electrode patterns also give the same effects as the abovementioned embodiments.

The types of the divided electrode patterns are not limited to the abovementioned ones, so that it is possible to obtain almost the same effects by forming divided electrode patterns in such a way that they may have the geometries and the number of divisions corresponding to the wave-front aberration distribution to be coped with.

Third Embodiment

The abovementioned first and second embodiments have such a structure that the LCD panel 3 is located, as shown in FIG. 1, in the optical path of the objective lens 5 so as to intersect the optical axis perpendicularly, i.e. at an angle of 90 degrees.

In such a case where the LCD panel 3 and the optical axis intersect perpendicularly, the laser beam B reflected at the surfaces of the glass substrate 301a or 301b or the transparent electrode 302a or 302b of the LCD panel 3 may become stray light, entering the photoreceptor 8.

To prevent this, it is necessary to form a reflection-preventing film at the boundary between the glass substrates 301a and 301b and between the transparent electrodes 302a and 302b and also between the orientation films not illustrated in the accompanying drawings, thus making the optical pickup rather expensive.

To solve this problem, the third embodiment has the LCD panel 4 titled with respect to the optical axis by a prescribed angle so that the glass substrates 301a and 301b and the transparent electrodes 302a and 302b of the LCD panel 4 may also be tilted with respect to the optical axis.

As a result, even when the laser beam is reflected at the surface of the glass substrate 301a or 301b or the transparent electrode 302a or 302b of the LCD panel 4 or an orientation film not illustrated here, the reflected beam is emitted so as to be apart from the optical axis, so that it may not become stray light nor enter the photoreceptor 8.

Therefore, there is no need to form any refraction-preventing films, thus preventing the optical pickup from becoming expensive.

What is claimed is:

1. A wave-front aberration compensation unit, comprising:
    an optical-path changing mechanism, comprising:
        a laser light source which emits a laser beam of light;
        a polarization beam splitter which polarizes said light and transmits said laser beam;
        an LCD panel which receives said polarized light from said polarization beam splitter;
        a quarter wavelength plate which receives said polarized light emitted from said LCD panel and which gives a quarter wavelength difference in an optical path of said polarized light which vibrate mutually perpendicularly;
        an optical disk;
        an objective lens which converges said laser beam emitted from said quarter wavelength plate onto said optical disk;
        a converging lens which converges said laser beam reflected by said optical disk and transmitted through said objective lens, said quarter wavelength plate and said LCD panel and then reflected by said polarization beam splitter;
        a photoreceptor which receives said laser beam converged by said converging lens and which photo-electrically transfers said laser beam and then sends out said laser beam as a read-out signal;
        a tilt sensor which detects a tilt of said optical disk and sends a tilt detection signal;
        an LCD panel control circuit which controls a varying amount of voltage applied as a voltage signal to said LCD panel based on said tilt detection signal and an inputted external disk selection signal;
        wherein an electrode pattern is formed on said LCD panel based on said voltage signal, such that a numerical aperture of said objective lens is changed to compensate for wave-front aberrations due to disk tilt and differences in disk thickness.

2. A wave-front aberration compensation unit which is located in an optical path between a light source and an objective lens to compensate wave-front aberrations of light emitted from said light source which are then output onto an on optical disk, comprising:
    an optical-path changing means which changes by a prescribed length an optical path of optical flux which enters said objective lens, based on an external voltage signal;
    wherein said optical-path changing means comprises:
        a refractive index changing means for changing a refractive index based on an application voltage due to said voltage signal;
        tilt detection means for detecting a tilt of said optical disk and outputting a tilt detection signal; and
        a voltage applying means for applying a voltage onto said refractive-index changing means to change an optical path length of light based on said tilt detection signal, said voltage applying means having a geometry corresponding to a wave-front aberration distribution given by an optical system.

3. A wave-front aberration compensation unit which is located in an optical path between a light source and an objective lens to compensate wave-front aberrations of light emitted from said light source which are then output on an optical disk, comprising:
    tilt detection means for detecting a tilt of said optical disk and outputting a tilt detection signal;
    rotation-angle/optical-path length changing means which rotates, by a prescribed angle based on an external voltage signal, a portion of an optical flux, which enters said objective lens, corresponding to a predetermined incident point and, at the same time, changes by a prescribed length an optical path of a portion of an optical flux whose wave-front aberrations are in excess of a prescribed standard value;
    wherein said rotation-angle/optical-path changing means comprises:
        means for changing both a rotation angle of and a refractive index of a changing surface based on said voltage signal;
        a first electrode which applies voltage onto said rotation-angle/refractive-index changing means by utilizing its own geometry determined based on a desired numerical aperture in order to rotate, by a prescribed angle, a portion of a polarization plane of light flux, which enters said objective lens, corresponding to a predetermined incident point; and
        a second electrode which is paired with said first electrode and also which applies voltage onto said refractive-index changing means to change an optical-path length of this portion of light flux by utilizing its own geometry corresponding to a wave-front aberration distribution given by an optical system;
    wherein said voltage is varied based on said tilt detection signal, such that a numerical aperture of said objective lens is changed to compensate for said wave-front aberrations due to disk tilt and differences in disk thickness.

4. A wave-front aberration compensation device, comprising:
- a wave-front aberration compensation unit which is located in an optical path between a light source and an objective lens to compensate wave-front aberrations of light emitted from said light source, including:
  - an optical-path changing means which changes by a prescribed length an optical path of optical flux which enters said objective lens, based on an external voltage signal;
  - wherein said optical-path changing means includes:
    - a refractive index changing means for changing a refractive index based on an application voltage due to said voltage signal; and
    - a voltage applying means for applying a voltage onto said refractive-index changing means to change an optical path length of light, said voltage applying means having a geometry corresponding to a wave-front aberration distribution given by an optical system;
- voltage application means which applies, based on external information, a prescribed value of voltage corresponding to said information, onto said refractive-index changing means; and
- tilt detection means which detects a tilt of an optical recording medium with respect to an optical axis and then sends out a detection signal to said voltage application means.

5. A wave-front aberration compensation device, comprising:
- a wave-front aberration compensation unit which is located in an optical path between a light source and an objective lens to compensate wave-front aberrations of light emitted from said light source, including:
  - rotation-angle/optical-path length changing means which rotates, by a prescribed angle based on an external voltage signal, a portion of an optical flux, which enters said objective lens, corresponding to a predetermined incident point and, at the same time, changes by a prescribed length an optical path of a portion of an optical flux whose wave-front aberrations are in excess of a prescribed standard value;
  - wherein said rotation-angle/optical-path changing means includes:
    - means for changing both a rotation angle of and a refractive index of a changing surface based on said voltage signal;
    - a first electrode which applies voltage onto said rotation-angle/refractive-index changing means by utilizing its own geometry determined based on a desired numerical aperture in order to rotate, by a prescribed angle, a portion of a polarization plane of light flux, which enters said objective lens, corresponding to a predetermined incident point; and
    - a second electrode which is paired with said first electrode and also which applies voltage onto said refractive-index changing means to change an optical-path length of this portion of light flux by utilizing its own geometry corresponding to a wave-front aberration distribution given by an optical system;
- voltage application means which applies, based on external information, a prescribed value of voltage corresponding to said information onto said electrodes; and
- tilt detection means which detects a tilt of an optical recording medium with respect to an optical axis and then sends out a detection signal to said voltage application means.

6. A wave-front aberration compensation unit as claimed in claim 2, wherein said optical-path changing means changes by a prescribed length an optical path of portion of optical flux entering said objective lens whose wave-front aberrations are in excess of a standard value.

7. A wave-front aberration compensation unit as claimed in claim 2, wherein said wave-front aberrations mainly consist of comatic aberrations.

8. A wave-front aberration compensation unit as claimed in claim 2, wherein said wave-front aberrations are those given at a best image point having least wave-front aberrations.

9. A wave-front aberration compensation device which comprises a wave-front aberration compensation unit as claimed in claim 2, further comprising: voltage application means which applies, based on external information, a prescribed value of voltage corresponding to said information, onto said electrodes.

10. A wave-front aberration compensation device as claimed in claim 9, wherein
said external information comprises information of types of an optical recording medium and information of tilts of recording surfaces of said optical recording medium.

11. A wave-front aberration compensation unit as claimed in claim 3, wherein said wave-front aberrations mainly consist of spherical aberrations and comatic aberrations.

12. A wave-front aberration compensation unit as claimed in claim 3, wherein said wave-front aberrations are those given at a best image point having least wave-front aberrations.

13. A wave-front aberration compensation unit as claimed in claim 3, wherein said rotation-angle/optical-path changing means is composed of LCD elements.

14. A wave-front aberration compensation device which comprises a wave-front aberration compensation unit as claimed in claim 3, further comprising: voltage application means which applies, based on external information, a prescribed value of voltage corresponding to said information onto said electrodes.

15. A wave-front compensation device as claimed in claim 14, wherein
said external information comprises information of types of an optical recording medium and information of tilts of recording surfaces of said optical recording medium.

16. A wave-front aberration compensation unit as claimed in claim 2, wherein said optical-path changing means is composed of LCD elements.

* * * * *